United States Patent
Biatek et al.

(10) Patent No.: US 12,244,843 B2
(45) Date of Patent: Mar. 4, 2025

(54) PERSONALIZATION OF A VIDEO SEQUENCE

(71) Applicant: ATEME, Velizy Villacoublay (FR)

(72) Inventors: Thibaud Biatek, Versailles (FR); Mohsen Abdoli, Thorigne Fouillard (FR); Christophe Gisquet, Acigne (FR)

(73) Assignee: ATEME, Velizy Villacoublay (FR)

( * ) Notice: Subject to any disclaimer, the term of this patent is extended or adjusted under 35 U.S.C. 154(b) by 140 days.

(21) Appl. No.: 17/704,219

(22) Filed: Mar. 25, 2022

(65) Prior Publication Data
US 2022/0312026 A1    Sep. 29, 2022

(30) Foreign Application Priority Data
Mar. 26, 2021  (EP) ................................. 21305386

(51) Int. Cl.
*H04N 19/105* (2014.01)
*H04N 19/109* (2014.01)
(Continued)

(52) U.S. Cl.
CPC ........... *H04N 19/46* (2014.11); *H04N 19/105* (2014.11); *H04N 19/109* (2014.11); *H04N 19/119* (2014.11); *H04N 19/139* (2014.11); *H04N 19/159* (2014.11); *H04N 19/167* (2014.11); *H04N 19/176* (2014.11); *H04N 19/52* (2014.11)

(58) Field of Classification Search
CPC .... H04N 19/46; H04N 19/105; H04N 19/109; H04N 19/119; H04N 19/139; H04N 19/159; H04N 19/167; H04N 19/176; H04N 19/52
See application file for complete search history.

(56) References Cited

U.S. PATENT DOCUMENTS

| | | | | |
|---|---|---|---|---|
| 6,577,679 | B1 * | 6/2003 | Apostolopoulos | H04N 19/21 348/420.1 |
| 2017/0324973 | A1 | 11/2017 | Tanner et al. | |
| 2018/0007364 | A1 * | 1/2018 | Noraz | H04N 19/182 |

FOREIGN PATENT DOCUMENTS

JP          6825480 B2 *   2/2021   ........... G06F 3/1454

OTHER PUBLICATIONS

Search Report and Search Opinion issued in related application EP 21305386.1, Aug. 25, 2021, 8 pages.

* cited by examiner

*Primary Examiner* — Chikaodili E Anyikire
*Assistant Examiner* — Berteau Joisil
(74) *Attorney, Agent, or Firm* — Faegre Drinker Biddle & Reath LLP

(57) ABSTRACT

A method for processing a current image of a set of images is proposed, which comprises, at a video processing device comprising a processor: determining a target pixel area in the current image; obtaining a hidden image, comprising a source pixel area, of the set of images; dividing the current image into blocks for an encoding of the blocks according to an encoding sequence; and for a block of the target pixel area: determining a motion vector pointing to a block of the source pixel area in the hidden image corresponding to the block of the target pixel area, and based on the motion vector, encoding the block of the target pixel area according to a temporal correlation prediction mode pursuant to which no pixel residual representing a difference between the block of the target pixel area and the corresponding block of the source pixel area is generated.

19 Claims, 13 Drawing Sheets

(51) Int. Cl.
*H04N 19/119* (2014.01)
*H04N 19/139* (2014.01)
*H04N 19/159* (2014.01)
*H04N 19/167* (2014.01)
*H04N 19/176* (2014.01)
*H04N 19/46* (2014.01)
*H04N 19/52* (2014.01)

PERSONALIZATION OF A VIDEO SEQUENCE

CROSS-REFERENCE TO RELATED APPLICATIONS

This application claims priority benefit under 35 U.S.C. § 119(d) from European Patent Application No. 21 305 386.1, filed Mar. 26, 2021, the disclosure of which is incorporated by reference herein in its entirety.

FIELD

The present disclosure relates to a method for processing a current image of a set of images during the encoding of the set of images. More precisely, the present disclosure relates to a method for incrusting an image in another image.

BACKGROUND

The world of distribution or broadcasting of digital television has undergone major changes over the recent years. New audiovisual services such as video on demand (VOD, standing for "Video On Demand"), or catch-up television (in English "Catch-Up TV" or "Replay") have been added to traditional distribution carried out live via pay television operators (e.g. digital packages and/or Internet access providers (ISPs)) for so-called linear television (ADSL (standing for Asymmetric Digital Subscriber Line), Satellite, Cable, IPTV, Fiber, Digital Terrestrial Television (DTT), etc.).

Video streams that are broadcast or distributed (whether or not in live) are commonly interrupted by short breaks, typically for presenting advertising to viewers. These breaks may usually be achieved by substituting portions of the broadcast video stream with one or more other video streams. The methods used to insert these breaks typically rely on the insertion of metadata into a stream indicating to the decoder at the end of the distribution chain (e.g. at a video player of a user device) a timing at which it must perform the substitution, and an address at which it can obtain the video stream to be played as a replacement. The insertion can also be done upstream of the receiver, for example during a regional re-multiplexing, or even within a CDN (content delivery network), or at the gateway level in the video distribution network.

However, these conventional schemes require to manage the time synchronization of video streams during insertion and playback, to download at the unit performing the substitution replacement video streams sufficiently in advance, and/or to manage the insertion and transport of end-to-end time and metadata markers in the chain.

Alternative methods have emerged with the development of recent video coding formats allowing to work in picture-in-picture mode, such as the High Efficient Video Coding (HEVC), AOMedia Video 1 (AV1), and Versatile Video Coding (VVC) video coding formats. The purpose of this mode (picture-in-picture) is to embed an image in a host image. The picture-in-picture mode may be achieved by using one or more predefined pixel areas in the host image, which are sometimes referred to as "tiles" in the context of HEVC, AV1, VVC or EVC, or as "subpictures" in the context of VVC. The embedding of an image in a host image according to these alternative schemes may be achieved by simultaneously decoding and displaying several video streams in parallel, or by substituting sub-parts of a video stream using the predefined pixel areas of the host image (e.g. tiles in HEVC, VVC and EVC, and subpictures in VVC).

However, the simultaneous decoding and displaying of several video streams in parallel requires the use of two decoders at the video player in order to decode two video streams in parallel and synchronize them during display, rendering this scheme very energy hungry, which can be problematic for mobile platforms. In addition, the simultaneous decoding and displaying of several video streams in parallel requires fine frame-by-frame synchronization in order to correctly render the keying, which increases the complexity of implementation.

Furthermore, even though the substitution of sub-parts of a video stream may be implemented with only one decoder, the image processing complexity is shifted to the level of the insertion itself which requires a fine analysis of the bit stream in order to identify the tiles or sub-images to be replaced. In addition, the issue of frame-accurate synchronization remains for implementing the substitution.

There is therefore a need for providing an improved image processing scheme and apparatuses implementing the same that address at least some of the above-described drawbacks and shortcomings of the conventional technology in the art.

There is also a need for providing an improved method for processing a current image to embed another image in the current image and apparatuses implementing the same.

It is an object of the present subject disclosure to provide an improved image processing scheme and apparatuses implementing the same that address at least some of the above-described drawbacks and shortcomings of the conventional technology in the art.

Another object of the present subject disclosure is to provide an improved scheme for processing an image and apparatuses implementing the same for alleviating the above-described drawbacks and shortcomings of conventional video monitoring schemes, in particular with respect to personalizing images of a video stream.

SUMMARY

To achieve these objects and other advantages and in accordance with the purpose of the present subject disclosure, as embodied and broadly described herein, in one aspect of the present subject disclosure, a method for processing a current image of a set of images is proposed. The proposed method comprises, at a video processing device comprising a processor: determining a target pixel area in the current image; obtaining a hidden image of the set of images, the hidden image comprising a source pixel area; dividing the current image into blocks for the encoding of the blocks of the current image according to an encoding sequence; and for a block of the target pixel area of the current image: determining a motion vector pointing to a block of the source pixel area in the hidden image corresponding to the block of the target pixel area, and based on the motion vector, encoding the block of the target pixel area according to a temporal correlation prediction mode pursuant to which no pixel residual representing a difference between the block of the target pixel area and the corresponding block of the source pixel area is generated.

The proposed method advantageously allows, depending on the embodiment, inserting an image into another image, and inserting an image into one or several images of a video sequence, while mitigating the above-described drawbacks and shortcomings of the conventional technology in the art.

Indeed, advantageously, the use of at least one hidden image to insert pixels in a personalized area of a current image alleviates the above-mentioned synchronization constraints, while allowing to display content different from the main content of the video sequence without increasing the bitrate of the video sequence. Furthermore, advantageously, it may be possible to insert a plurality of personalized area in a video sequence in a simply way contrary to the prior art where the insertion of plurality of areas (as tiles) lead to complex synchronization scheme. Finally, the method has low overhead in that it does not require important CPU resources to perform the insertion and does not degrade the video content because of lossy coding or reencoding.

In one or several embodiments, the method may further comprise: obtaining metadata defining the target pixel area in the current image.

In one or several embodiments, the metadata may comprise source pixel area metadata and target pixel area metadata, and the source pixel area metadata may comprise information on a size, shape, and/or location of the source pixel area in the hidden image, and the target pixel area metadata may comprise information on a size, shape, and/or location of the target pixel area in the current image In one or several embodiments, the hidden image may be generated at the processing device.

In one or several embodiments, the source pixel area in the hidden image and the target pixel area in the current image may have common features, such as size, shape, resolution, and/or location in the image.

In one or several embodiments, the hidden image may be an alternative reference frame.

In one or several embodiments, the current image may be divided into blocks such that none of the blocks located outside the target pixel area and adjacent to the target pixel area may overlap with a block located inside the target pixel area.

Advantageously, such a block partitioning may avoid potential artefacts occurring when decoding the image.

In one or several embodiments, the current image may be divided into blocks such that a size of blocks adjacent to a border of the target pixel area may be a smallest size among respective sizes of blocks of the current image, and the border of the target pixel area may be determined by blocks located inside the target pixel area that may be adjacent to blocks located outside the target pixel area.

In one or several embodiments, the target pixel area may be an animated target pixel area corresponding to a plurality of source pixel areas in the hidden image, the plurality of source pixel areas in the hidden image respectively may correspond to images of an animation played in the animated target pixel area.

Advantageously, it may be possible to incrust an animation area in a video sequence without the previous mentioned drawbacks of the prior art. Furthermore, it may be possible to incrust animated personalized content for users.

In one or several embodiments, one or several respective corresponding blocks of each of the plurality of the source pixel area may be predicted from other respective corresponding blocks of the plurality of source pixel areas.

In one or several embodiments, one or more blocks of the current image located outside of the target pixel area may be predicted only based on one or more blocks located outside the target pixel area in the current image, and/or one or more blocks located outside an area that may correspond to the target pixel area in one or more reference images.

Advantageously, it may be possible to prevent the phenomenon of drifting at the decoder side.

In one or several embodiments, the hidden image may be replaced by another hidden image comprising one or several source pixel areas.

Advantageously, it may be possible to change, in a simple and efficiency way, the content of a target pixel area of a video sequence without necessarily decoding and re-encoding the all video sequence.

In another aspect of the present subject disclosure aims to a method for processing an encoded video bitstream at a video processing unit, the method may comprise: receiving the encoded video bitstream, wherein the encoded video bitstream may comprise data representing the encoding of a current image in a set of images; obtaining an image; decoding the encoded video bitstream, the decoding comprising: generating a decoded hidden image of the set of images; based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to perform a method for processing an image as proposed, which comprises: determining a target pixel area in the current image; obtaining a hidden image of the set of images, the hidden image comprising a source pixel area; dividing the current image into blocks for the encoding of the blocks of the current image according to an encoding sequence; and for a block of the target pixel area of the current image: determining a motion vector pointing to a block of the source pixel area in the hidden image corresponding to the block of the target pixel area, and based on the motion vector, encoding the block of the target pixel area according to a temporal correlation prediction mode pursuant to which no pixel residual representing a difference between the block of the target pixel area and the corresponding block of the source pixel area is generated.

As another example, in embodiments, the present subject disclosure provides a non-transitory computer-readable medium encoded with executable instructions which, when executed, causes an apparatus comprising a processor operatively coupled with a memory, to perform a method for processing an encoded video bitstream as proposed, which comprises: receiving the encoded video bitstream, wherein the encoded video bitstream may comprise data representing the encoding of a current image in a set of images; obtaining an image; decoding the encoded video bitstream, wherein the decoding may comprise: generating a decoded hidden image of the set of images; based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

Other features, details and advantages are shown in the following detailed description and on the figures, on which.

DETAILED DESCRIPTION

Figure 1:
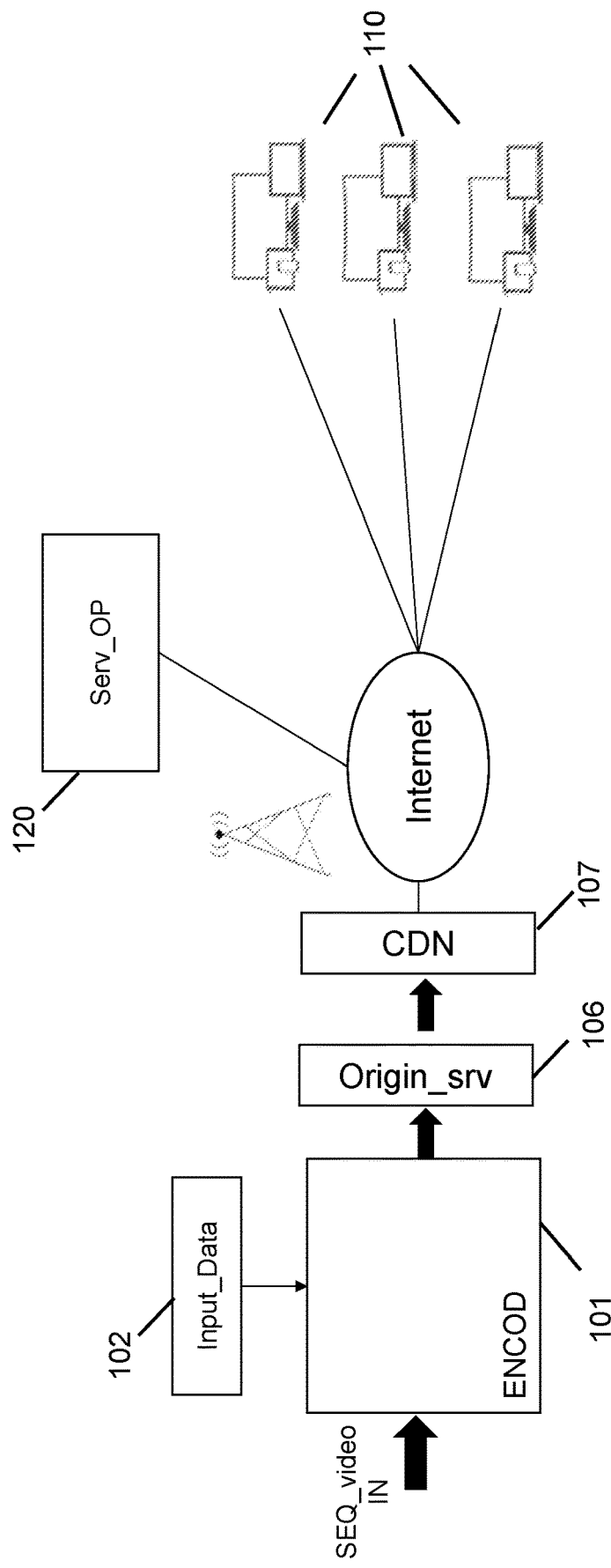
FIG. 1 shows an exemplary video distribution system according to one or more embodiments of the present subject disclosure.

For simplicity and clarity of illustration, the drawing figures illustrate the general manner of construction, and descriptions and details of well-known features and techniques may be omitted to avoid unnecessarily obscuring the discussion of the described embodiments of the present disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fiber, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application" or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The term "multimedia content" as used in the present description corresponds to any audio and/or video or audio-visual content, with or without closed captions, open captions, subtitles, timed text or visual descriptors.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service.

In the present description, the terms "real-time" are also used in the context of video encoding or compressing video content, to denote the encoding or compression of video content at least at the same speed, for example expressed in frames per second, as it is generated by one or more video content sources. For instance, if content is generated at 50 frames per second (fps) it will be deemed encoded in real-time as long as it is also encoded at at least 50 fps.

In the present description, the term "live content" refers to content, for example multimedia content, that is distributed, for example using an OTT distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "terminal", "user equipment", "user device", "reader", "reading device", "reading terminal," "video player," and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

As used herein, the term "pixel" means a picture element or an elementary component of an image, a color component image, or a (luma or chroma) channel type image, and data corresponding thereto, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called in the present subject disclosure a luma pixel, a luma sample, or for the sake of simplicity a pixel), and $C_b$ and $C_r$ are the blue-difference and red-difference chroma components of the pixel (also called in the present subject disclosure a chroma pixel, a chroma sample, or for the sake of simplicity a pixel). Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "pixel" may be used to refer, depending on the embodiment and on the image to which it pertains (which may be a YCbCr image, a component image, a chroma component image, a luma component image, etc.), to a pixel of an original image, a luma channel pixel, a chroma channel pixel, a Cb pixel, a Cr pixel, a chroma component pixel, a luma component pixel, a chroma sample, a luma sample, etc.

In the following, the term "plane" may be used to refer to, depending on the embodiment, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The methods proposed in the present subject disclosure may advantageously be implemented by any video source encoder, or video codec configured for encoding images (or frames) of input video data, such as, for example a video encoder and/or codec compliant with any of the Alliance for Open Media (AOM) AV1, H.265/HEVC, MPEG-4 Part 2, SHVC (Scalable HEVC), and H.266/VVC specifications or standards, whether in their existing versions and/or their evolutions, as the case may be adapted for implementing one or more embodiments of the proposed methods.

Video data is generally the subject of source coding aimed at compressing it in order to limit the resources required for its transmission and/or their storage. There are many encoding standards, such as those previously mentioned.

A video sequence may usually comprise a set of images (also called set of frames, or set of pictures). In conventional encoding schemes, the images of the video sequence to be encoded are typically considered according to an encoding sequence, and each is divided into sets of pixels which are also processed sequentially, for example starting at the top left and ending at the bottom. to the right of each image.

In one or more embodiments, an image undergoing processing (e.g. encoding or compression) is typically divided into blocks or coding units (which may also be referred to in some video coding standard specifications as "macroblocks units"), the form and size of which may be determined based on the size of the pixel matrix that corresponds to the image, for example into square-shaped macroblocks of size 16×16 pixels. In VVC and HEVC, the maximum size of a coding unit (CTU) is 128×128 pixels, the coding units of this size being called "Large Coding Units", or "LCU". The AV1 standard also uses a concept similar to the macroblock, and the LCU equivalent is called Super Block, or SB. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

In some embodiments, one or more component images among a luma component image, a first chroma component image and a second chroma component image may be extracted from an input image to be processed. Image data of each component image extracted from the input image may comprise pixel data referred to as "component pixels", and which may also be referred to in the present subject disclosure as "pixels" for the sake of simplicity.

Each of the plurality of component images may then be divided into respective sets of component pixel blocks, and respective processing sequences of the component pixel blocks of the sets of component pixel blocks may be defined for purposes of processing the blocks of the component images according to respective processing sequences.

In some embodiments, the dividing the luma component image, and the first and second chroma component images into blocks may lead to obtaining one or more separate sets of blocks, each set corresponding to a luma and/or a chroma component, such as, for example, a Y component, a Cr component and/or a Cb component, or as another example, a Y component, a U component and/or a V component. Therefore in some embodiments, the dividing a component image (e.g. the luma component image, first and/or second chroma component images) may result in one or more sets of blocks, which blocks corresponding to different component images may possibly be co-located with corresponding blocks in a different component image.

Therefore, in one or more embodiments, each of one or more component images extracted from an image of a video sequence (which, depending on the embodiment, may for example be a YCbCr image, a Y image (luma component image), a Cr and/or Cb chroma component image) may be divided into a plurality of pixel blocks, which may or may not be of equal size or of same shape, for purposes of encoding the component image through encoding of the blocks according to a processing sequence defined based on the partitioning of the component image into blocks. A pixel block may have different sizes depending on the (component) image based on which the partitioning into blocks was performed.

In some embodiments, in particular in the context of video coding, the dividing of an image into blocks may be performed using a partitioning of the image into blocks. For example, a partitioning may divide an image area (whether of square or rectangular shape) into one to four partitions, for example each being of square or rectangular shape.

Therefore in some embodiments a current image, which is divided into blocks according to embodiments of the present subject disclosure, may correspond to a component image (e.g. a luma component image or a chroma component image) extracted from an input image in a set of images (e.g. an input video sequence), and the blocks resulting from the dividing or partitioning of the image may comprise component pixels.

In embodiments in the context of video coding, the encoding of an image of a video sequence may comprise the dividing a matrix of pixels corresponding to an image (which may correspond to a component image extracted from the image to be encoded) into several sets, for example blocks of fixed size 16×16, 32×32, 64×64, or 128×128 and by encoding these blocks of pixels according to a given processing sequence. The processing of a block (or set) of pixels may typically comprise a prediction of pixels of the block, which may be performed using causal pixels, that is, previously encoded pixels of the image being encoded, in which case we speak of prediction by spatial correlation, or "intra" prediction, and/or using pixels from previously encoded images, in which case we speak of prediction by temporal correlation, or "inter" prediction.

This exploitation of spatial and temporal redundancies makes it possible to avoid transmitting or storing the value of the pixels of each block (or set) of pixels, by calculating for at least some of the blocks a residual of pixels (also called "residual" or "pixel residual") representing a gap, or distance, or difference, between pixels of the block and corresponding pixels of a prediction block determined for the block. Pixel residual data may be present in the data generated by the encoder, and transmitted to the decoder in some embodiments, after transform (for example, of DCT type) and quantization in order to reduce the entropy of the data generated by the encoder.

An image of a video stream (or video sequence) being processed is thus typically divided into blocks of respective shape and size, for example in shaped blocks of 16×16 pixels square. A set of blocks is thus formed for which a processing sequence is defined (also called "processing path"). For example, the blocks of the current image may be processed by starting with the one located at the top left of the image, followed by the one immediately to the right of the previous one, until reaching the end of the first row of blocks to pass to the leftmost block in the row immediately below, to end processing with the lower rightmost block of the image.

Specific intra or inter prediction modes exist: For instance, a specific inter prediction mode sometimes referred to as a "skip" mode may be defined in some video coding standard specifications, as corresponding to the decision not to transmit a pixel residual for a current block which is considered not to have changed compared to its prediction block. The number and names of these specific modes evolve with video coding standards, which may be referred to for further details.

One may therefore consider a so-called "current block," that is, a block being under processing in a current image being processed. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the prediction of the block pixels typically includes a selection of a prediction type, and the generation of prediction data that correspond to the selected prediction type, which may form, together with prediction type selection data, a set of encoding parameters.

A video encoder using prediction coding, whether it is spatial prediction coding (e.g. intra prediction) or temporal prediction coding (e.g. inter or skip prediction), will typically include a decoder unit, or pixel reconstruction unit, configured for generating reconstructed pixels, from the reconstructing of pixels that have been encoded, which reconstructed pixels are used for the prediction of pixels of a current block (i.e. pixels of a block being encoded).

In addition of the use of prediction based on macroblocks or CTU (or encoding block), video compression schemes may also use so-called "group of pictures" (or "GOP", which may sometimes be referred to as "group of frames" or "group of images"), to define an order in which the images of a video sequence (or video stream) are arranged. A GOP is typically repeated periodically until the end of encoding. These groups of pictures may comprise several types of images (or pictures), such as type I, type P, and/or type B images as described further below.

FIG. 1 shows an exemplary video distribution system according to one or more embodiments of the present subject disclosure.

Shown on FIG. 1 is a video sequence SEQ_video IN (e.g. in real-time), for example produced by a content editor, provided as input data to a video encoder 101. According to the non-limiting exemplary architecture illustrated on FIG. 1, the encoder 101 may be located at a video head end. The set of images of the video sequence SEQ_video IN may be encoded using any suitable encoding scheme, such as the above-mentioned standard video coding/compression schemes (e.g. AV1, VVC, etc.).

In order to perform the encoding of the video sequence, the encoder 101 may also be configured to receive input data Input_Data 102 comprising configuration data for editing images of the video sequence during encoding. For instance, input data Input_Data 102 may comprise metadata providing image processing parameters to the encoder 101, such as, for example, a number of encoding profiles expected in the output encoded bitstream, each profile corresponding to a respective resolution and rate of the video sequence provided in input.

The use of a plurality of encoding profiles has at least the following advantages: A plurality of profiles makes it possible to address terminals with differing characteristics (supported codecs or features, screen resolution, decoding power). In addition, it offers the video players of these terminals the possibility of adapting to the available network bandwidth. Indeed, the reader of a client (of a terminal) can be configured to seek to reach the encoding profile corresponding to the highest bitrate, according to the bandwidth measurements that it continuously performs.

In one or more embodiments, the metadata may also comprise the type of prediction to use for encoding the video sequence.

In some embodiments, the encoder 101 may be configured to deliver an encoded bitstream divided into so-called media segments, and/or so-called media chunks of fixed duration, for example as specified by the Dynamic Adaptive Streaming over HTTP (DASH) protocol or the HTTP Live Streaming (HLS) protocol specifications. Segments and/or chunks may be then stored on a content server 106 ("Origin server") and then stored on content distribution networks 107, called "CDN" (from the English "Content Delivery Network"), providing caching capabilities that improve the quality of services, and minimize access times and latency.

Segments and/or chunks of the video sequence accessible from the CDN may be provided to one or more user devices 110 and/or may be provided to one or more service operators 120 which may distribute the video sequence to the one or more user devices 110, possibly with decoding and re-encoding the video sequence using a proposed image processing scheme according to one or more embodiments before distributing it to the user devices 110.

Figure 2A:
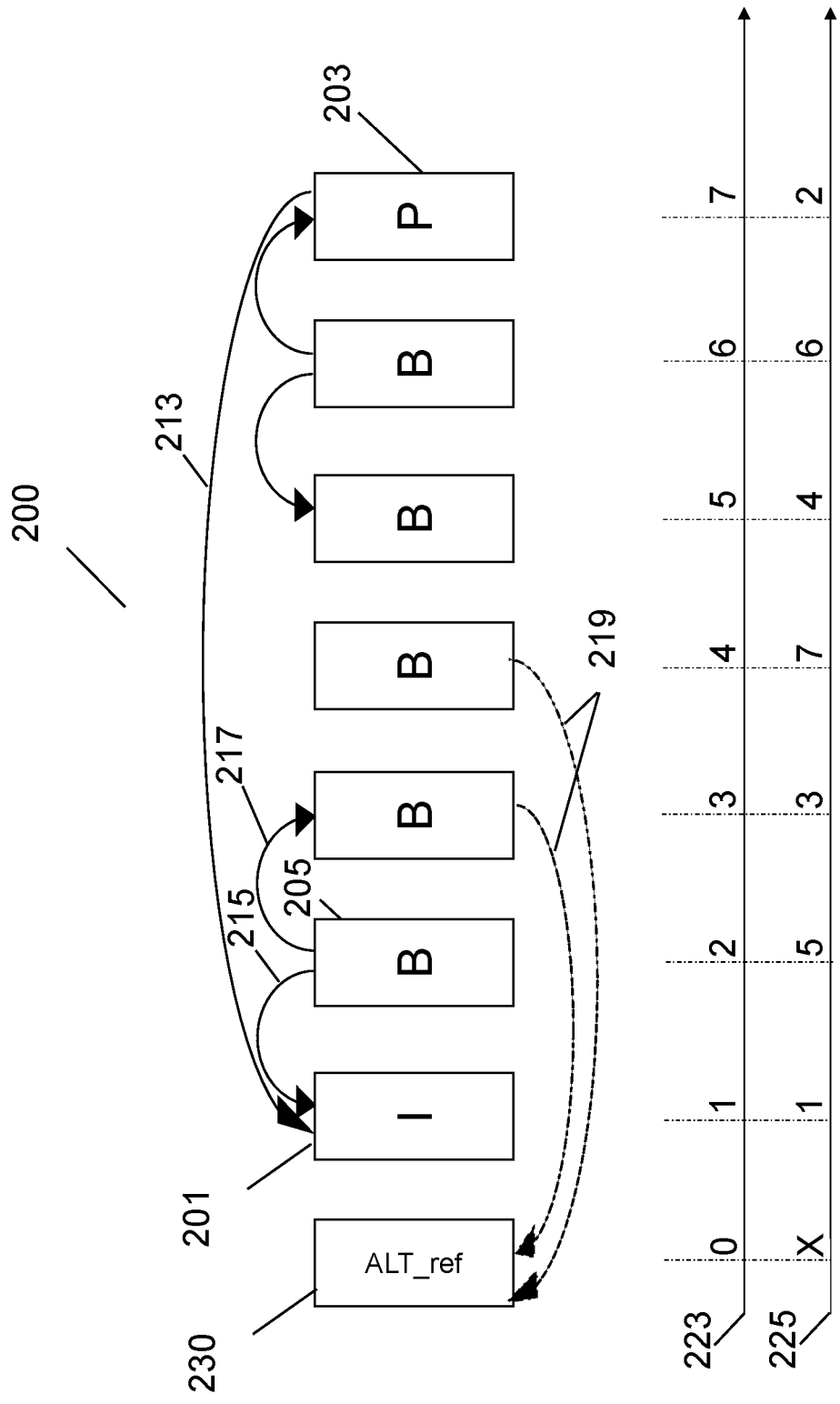
FIG. 2a and FIG. 2b illustrate exemplary group of pictures (GOP) that may be used in one or more embodiments.
Figure 2B:
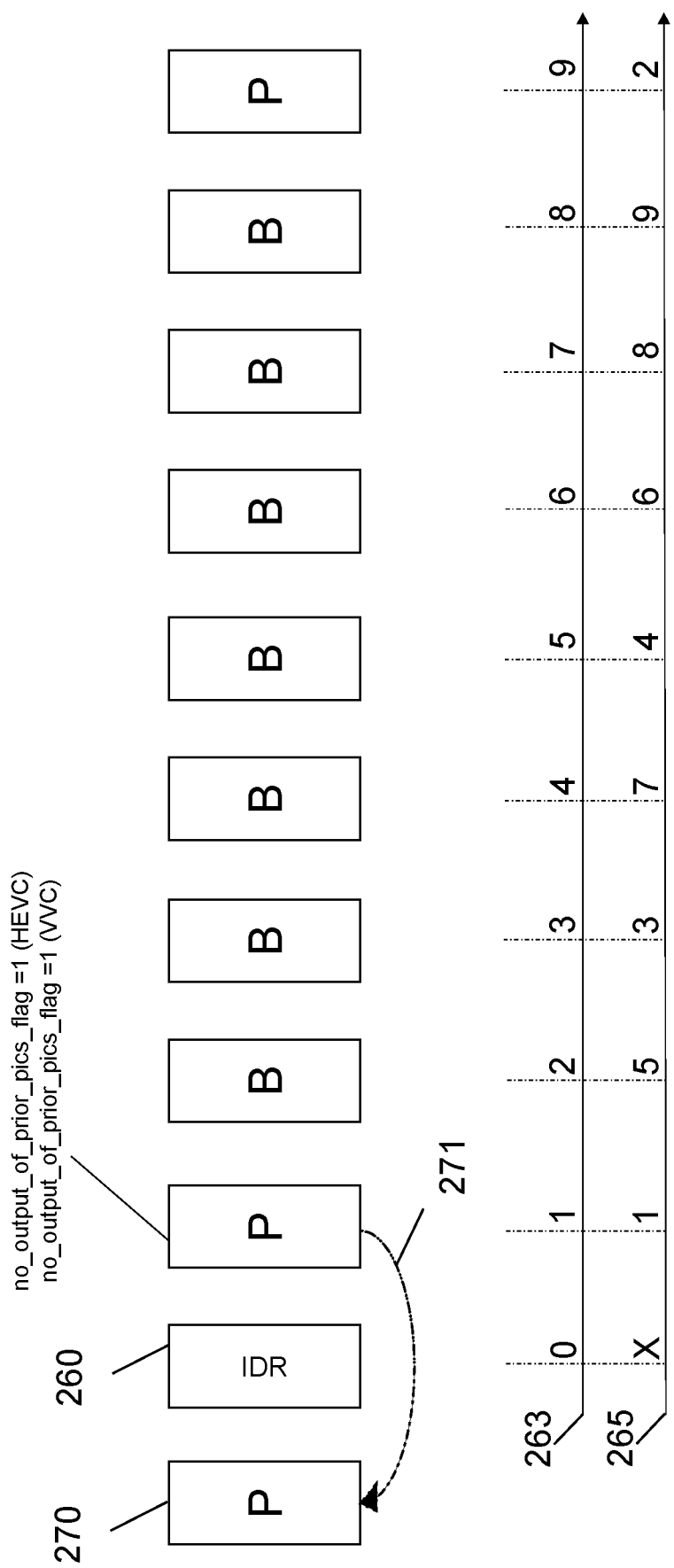

FIG. 2a and FIG. 2b illustrate exemplary group of pictures (GOP) that may be used in one or more embodiments.

FIG. 2a shows an exemplary GOP that may be used by embodiments of the present subject disclosure that use the AV1 video coding standard. The exemplary GOP 200 shown on FIG. 2a comprises images (also referred to as "frames") of respective types of image among the following types:

Type I (Intra) images: this type of image 201 designates images encoded using only the intra prediction mode. It therefore characterizes an image encoded based only on self-contained information, using spatial correlation prediction instead of temporal correlation prediction. A type I image will typically be used to decode other images of the GOP. A specific subtype is called the IDR: in this case (as depicted later with FIG. 2b), frames inside of the GOP cannot refer frames outside of the GOP. Otherwise, if a type I image is not an IDR, frames in the (so-called open) GOP can refer frames outside of it Type P images (Predictive): this type of image 203 designates images encoded using the inter prediction mode, and also possibly other prediction modes, such as the intra prediction mode. Temporal correlation prediction used for encoding a type P image only uses a single image 213 (hence the so-called uni-directional prediction) among images in the GOP that have been encoded prior to the type P image.

Type B images (Bidirectional): this type of image 205 also designates images encoded using the inter prediction mode, and also possibly other prediction modes, such as the intra prediction mode. In contrast with type P images, temporal correlation prediction used for encoding a type B image may use two images 215 & 217 among images in the GOP that have been encoded prior to the type B image. Rules specifying subsets of images among the ones previously encoded from which each of the two previously encoded images used for encoding the type B image may be selected are typically provided by video coding standard specifications, and may therefore vary according to the video coding standard used in embodiments of the present subject disclosure. In addition, video coding standards may use a different naming convention for the same bi-directional prediction: for instance, the AV1 standard refers to this prediction as "compound" prediction, and B images do not exist per se.

Referring back to FIG. 1, in one or more embodiments, the binary stream generated by the encoder 101 may comprise a series of GOPs, and the user devices 110 may be configured to use the GOP information for purposes of generating a video sequence to be displayed on the client device.

In the present subject disclosure, an image included in a set of images encoded by an encoder and signaled to a client device as not for display by the player of the client device may be referred to as a "hidden image". As shown on FIG. 2a, a GOP may in one or more embodiments comprise another type of hidden image 230 designating hidden images of the GOP that are signaled as not for display by a player reading the GOP sequence. Hidden images of a GOP may for example be used for the encoding/decoding of other images of the GOP, however without being displayed by a player reading the GOP sequence. For example, the hidden images 230 shown on FIG. 2a may be used for the temporal correlation prediction encoding/decoding of type B and/or type P images of the GOP, and/or for reducing the noise in the video sequence.

In the AV1 standard, so-called "alternative reference" (alt-ref) images of a GOP may correspond to hidden images and may typically be used as providing a denoised version of a background present in other images of the GOP.

The FIG. 2a also presents exemplary display 223 and decoding 225 sequences at e.g. a decoder side. As illustrated by FIG. 2a, in some embodiments the decoding sequence of the GOP may start with a hidden image 230 containing the personalization information. The images following the hidden image 230 in the decoding sequence may then advantageously use 219 personalization information contained in the hidden image 230 ("Alt-ref" image) to personalize the content in the images to be displayed.

FIG. 2b shows another exemplary GOP that may be used by embodiments of the present subject disclosure that use the HEVC or VVC video coding standards. The exemplary GOP shown on FIG. 2b comprises images of respective types of image among the following types: Type I (as illustrated by FIG. 2b the GOP may include one or more type I images which are of the IDR subtype), type P or type B. In some embodiments, if image 270 is to be used through prediction 271 to encode an image of the GOP, then image 260 may not be an IDR.

Similarly to FIG. 2a, exemplary display 263 and decoding 265 sequences are shown in FIG. 2b.

As illustrated by FIG. 2b, one or more hidden images 260 (e.g. IDR frames) of a GOP may be signaled in the GOP through a flag carried by metadata (such as, for example, a "slice header") related to an image of the GOP. For example, such flag may inform the decoder that images of the GOP prior to the one associated with the metadata carrying the flag are hidden images and should be handled as such, that is, may not be displayed by the client device. As shown in FIG. 2b, a so-called "no_output_of_prior_pics_flag=1" flag is specified by HEVC, while VVC may use a so-called "sh_no_output_of_prior_pics_flag=1" flag. For instance, to avoid displaying the personalization image 260, the image immediately following the personalization image 260 in the display sequence (number 1, type-P frame) may signal through the flag (e.g. in the slice header) that previous images in the sequence may not be outputted. This advantageously eases the temporal cutting of sequences and maintains the decodability of the stream, for example by ensuring that all reference frames to be expected for the decoding of images of the GOP are present.

According to embodiments of the present subject disclosure, hidden images of a video sequence may advantageously be used to display or incrust an image or a portion of an image in one or more images of the video sequence. In some embodiments, a source pixel area, also referred to as a "source pixel area" may designate a set of pixels of the image to be incrusted in a target image through decoding of such target image. A personalized area, also referred to as "target pixel area", may designate a set of pixels in the target image to be replaced by pixels of the source pixel area of the source image through decoding of the target image.

Media content may therefore advantageously be incrusted in one or more images of a video sequence in a transparent manner for the client device playing the decoded video sequence through the use of hidden images inserted in the video sequence.

Figure 3:
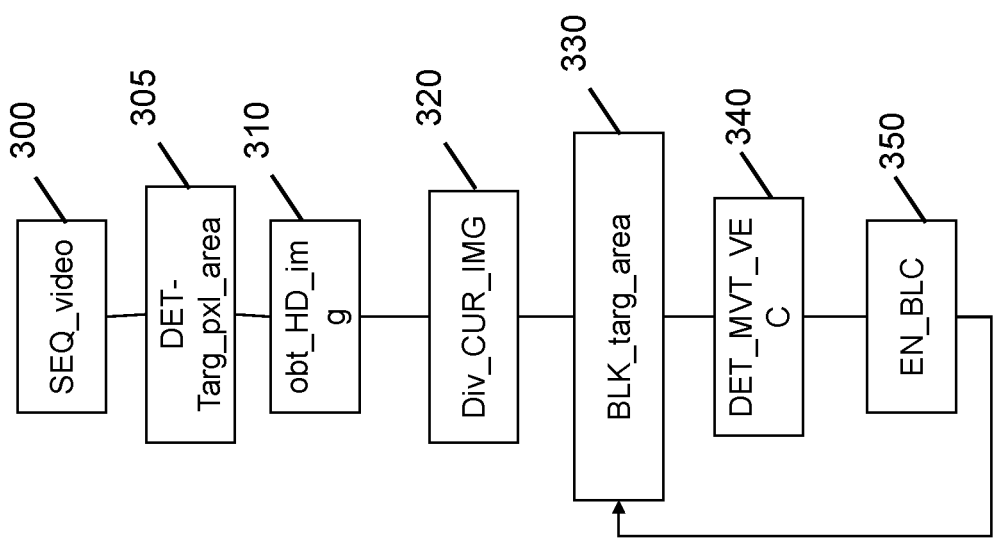
FIG. 3 shows a flowchart illustrating a proposed method for processing an image according to one or more embodiments of the present subject disclosure.

FIG. 3 shows a flowchart illustrating a proposed method for processing an image according to one or more embodiments of the present subject disclosure.

As shown on FIG. 3, a video processing device may receive (e.g. from a content editor) a video sequence 300 comprising a set of images to be processed, for instance for distribution to service operators and/or client devices.

For a current image of the set of images, a target pixel area may be determined 305 in the current image. In some embodiments, the target pixel area may be determined as a set of pixels of the current image which are to be replaced by pixels of one of more different images so as to personalize the current image. For instance, the target pixel area may be a pixel area of the current image in which a content owner or content distributor may want to insert advertising or information intended for viewers of the video sequence.

According to embodiments of the present subject disclosure, one or more hidden images of the set of images may be used as source image providing pixels to be used to replace pixels of the target pixel area of the current image. In some embodiments, a hidden image of the set of images may be obtained 310, the hidden image comprising a source pixel area.

In one or more embodiments, the target pixel area may be determined based on metadata obtained by the video distribution unit. Depending on the embodiments, such metadata may be determined and/or received by the video distribution unit.

In one or more embodiments, the metadata may comprise source pixel area metadata based on which a source pixel area may be determined in a hidden image, and target pixel area metadata based on which a target pixel area may be determined in the current image.

Depending on the embodiments, the source pixel area metadata may comprise information on a size, shape, and/or location of the source pixel area in the hidden image, and the target pixel area metadata may comprise information on a size, shape, and/or location of the target pixel area in the current image.

In some embodiments, the target pixel area metadata may further comprise data relative to one or several target pixel areas to insert in one or several (target) images of the set of images.

In some embodiments, the hidden image may comprise one or several source pixel areas which are intended to be used for the encoding/decoding of one or several target pixel areas in one or more images of the set of images (of the video sequence 300).

For example, during the encoding of a current image (an image may also be referred herein as a "frame," or as a "picture") of the set of images, the encoder may obtain metadata defining one or more target pixel areas in the current image and obtain a hidden image comprising one or more source pixel areas. The source pixel area may correspond to the area to be used for encoding blocks of the target pixel area of the current image, for instance according to a "skip" prediction encoding mode.

In one or more embodiments, pixels of one or more source pixel areas of the hidden image may be used to replace pixels of one or more target pixel areas of the current image through the encoding/decoding process applied to the current image which may advantageously be configured to use the hidden image.

The encoding of the current image may typically involve the dividing 320 the current image into blocks for the encoding of the blocks of the current image according to an encoding sequence. Depending on the embodiment, the dividing of the current image may be performed according to the encoding scheme used for encoding the current image, such as, for instance, that specified by image compression standard specifications. In some image compression standard specifications, such division into blocks may be referred to as a partitioning of the current image into blocks.

The determination of the blocks of the current image to be encoded/decoded, and the determination of an encoding sequence for encoding the blocks may therefore differ from one coding scheme to another, and may be performed in one or more embodiments according to a suitable image encoding scheme or standard as discussed above.

As the target pixel area may typically not comprise the whole current image, certain blocks determined by the division of the current area may be comprised in the target pixel area, while other blocks may not. In one or more embodiments, blocks which are not comprised in the target pixel area may be encoded according to the image encoding scheme chosen for encoding the current image. For example, such blocks may be encoded according to a prediction mode (e.g. a temporal correlation prediction mode, a spatial correlation prediction mode, etc.) usable pursuant to the image encoding scheme.

In some embodiments, encoding rules with respect of the current image may be defined in order to avoid artifacts in the video sequence, and may be provided to the encoder, for example through metadata related to the encoding of the current image. For example, encoding rules may be defined for the encoder to manage the encoding of blocks not comprised in a target pixel area. For instance, an encoding rule may prescribe that an image comprising a target pixel area is not to be used for the encoding of other images of the set of images. For instance, in one or more embodiments, the use of any inter prediction mode for encoding blocks of images of the set images which are not comprised in a target pixel area may be performed by using only blocks of past or future images which do not include a target pixel area. In this case, for the encoding of a current image comprising a target pixel area, the encoder (or encoding unit) may for instance use only intra prediction for the blocks of the current image not comprised in the target pixel area.

In other embodiments, an encoding rule may prescribe that the encoding of a block not comprised in a target pixel area may only use blocks which are not comprised in a target pixel area of past or future images of the video sequence.

Furthermore, in one or several embodiments, blocks that are located inside the target pixel area and are adjacent to one or more blocks outside of the target pixel area may define an area of the current image referred to herein as a "border".

In one or more embodiments, the dividing the image to be processed into blocks may be configured, for example through an encoding rule provided to the encoder, such that none of the blocks located outside a target pixel area and adjacent to such target pixel area overlaps with a block located inside such target pixel area. Such a block partitioning may advantageously avoid potential artefacts occurring when decoding the image, which may sometimes be referred to in the present subject disclosure as "drift artefacts."

In or more embodiments, the use of so-called "in-loop filters" used by certain encoding schemes, such as for example deblocking filters found in most video codecs, or the Adaptive Loop Filter in VVC or the Loop Restoration filter in AV1, may be avoided or forced into particular modes in order to address the occurrence of drift artefacts when some of the samples they apply to are modified by according to embodiments of the proposed method. Depending on the embodiment, the use of in-loop filters may be avoided through disabling such filters (as is possible for example on tile borders in HEVC and VVC), and/or through using prediction modes (in which case they may be applied to other parts of the image) for the encoding of blocks of a target pixel area which do not use such filters (such as, for example, so-called "transform skip", "palette" or IPCM modes in HEVC encoders, as such modes are not filtered). In or more embodiments, specific prediction or coding methods for the blocks on either side of the border may be used, e.g. the HEVC/VVC/AV1 "skip" mode, as loop filtering is disabled on a block coded using this method. In one or more embodiments, one or more padding areas (e.g. 4 lines or 4 columns, depending on the direction of the border) may be defined on each side of a border to ensure that the behavior of the active loop filter does not change. Such embodiments advantageously allow using prediction modes that use active loop filters while minimizing, if not avoiding, the impact of such filters on the image incrustation as proposed in the present subject disclosure.

In one or more embodiments, a determination may be made as to whether, given the blocks obtained by dividing the current image, the border is located at a multiple of the common size of blocks of the target pixel area in cases where the blocks of the target pixel area are of the same size, or the border is located at a multiple of the smallest size of blocks of the target pixel area in cases where the blocks of the target pixel area are of different sizes. In cases where the blocks of the target pixel area are of the same size, the border may be located at a multiple of such size, and in cases where the blocks of the target pixel area are of different sizes, the border may be located at a multiple of the smallest size of blocks of the target pixel area. For example, the smallest size of blocks of the target pixel area may be comprised between 4 and 8 pixels for the HEVC standard. Ensuring that the border is located at a multiple of the common size of blocks of the target pixel area in cases where the blocks of the target pixel area are of the same size, or that the border is located at a multiple of the smallest size of blocks of the target pixel area in cases where the blocks of the target pixel area are of different sizes may advantageously provide continuity without overlapping between the parts of the current image composed of blocks located outside the target pixel area, and blocks of the target pixel area.

In one or several embodiments, upon determining that the border is not located at a multiple of a blocks size of the personalized area, another division of the current image may be performed in order to obtain a border located at a multiple of the blocks size of the personalized area.

The encoding of blocks of the target pixel area may then be performed. According to embodiments of the present subject disclosure, the source pixel area of the hidden image may advantageously be used through encoding the blocks of the target pixel area according to a temporal correlation mode pursuant to which no pixel residual is generated available in the image encoding scheme used for encoding the current image, such as, for example, a "skip" mode.

For each block 330 of the target pixel area of the current image, a motion vector pointing to a block of the source pixel area in the hidden image corresponding to the block of the target pixel area may be determined 340. The block may then be encoded 350, based on the motion vector, according to a temporal correlation prediction mode pursuant to which no pixel residual representing a difference between the block and the corresponding block of the target pixel area is generated.

In one or more embodiments, the source pixel area of the hidden image may be co-located in the hidden image with the target pixel area in the current image, in which case the selected motion vector for blocks of the target pixel area may be the null motion vector, or a non-null constant motion vector.

In one or more embodiments, metadata may be provided to the encoder for managing the encoding of the current image (in particular the encoding of blocks of the target pixel area) according to embodiments of the present subject disclosure. Such metadata may in some embodiments define for the encoder the target pixel area in the current image. For example, metadata may comprise location data, size data, and/or resolution data of the target pixel area to be processed by the encoder in the current image. In some embodiments, metadata may comprise data identifying the hidden image, and instructing the encoder to use the source pixel area of the hidden image for encoding the target pixel area of the current image. The metadata may in some embodiments instruct the encoder to only use an inter prediction mode which does not generate any pixel residual for encoding the blocks of the target pixel area based on blocks of the source pixel area.

The encoder may then output an encoded bitstream comprising encoded data (the format and content of which may vary depending on the image encoding scheme used to encode the current image) relative to encoded images of the set of images of the video sequence.

In one or more embodiments, the encoded data may comprise encoded group of pictures comprising one or several encoded hidden images.

In one or more embodiments, the hidden image to be encoded, possibly as part of a GOP, may be generated at the video distribution unit. In other embodiments, the hidden image may be generated by a different entity and provided to the video distribution unit for processing of images of the video sequence.

In one or more embodiments, the target pixel area may be an animated target area defined based on a plurality of source pixel areas in the hidden image. In some embodiments, a source pixel area of the plurality of source pixel areas in the hidden image may correspond to an image of an animation to be played in the animated target pixel area.

In one or more embodiments, one or several blocks of a plurality of source pixel areas in a hidden image may be determined based on blocks of other source pixel areas of the plurality of source pixel areas. For example, one or more blocks of a source pixel area may be generated with pixel values corresponding to a distance or a difference between pixels of the block of the source pixel area and corresponding pixels of a corresponding block of another source pixel area. This advantageously allows decreasing the bitrate of the hidden image since one or several source pixel areas of the plurality of source pixel areas may be defined by only the differences (e.g. motion differences) with other source pixel areas of the hidden image. For instance, the source pixel areas corresponding to an image T4 of the animation may be defined by the difference with the source pixel area corresponding to the image T3, or T2, or T1, or T0 of the animation.

Figure 4:
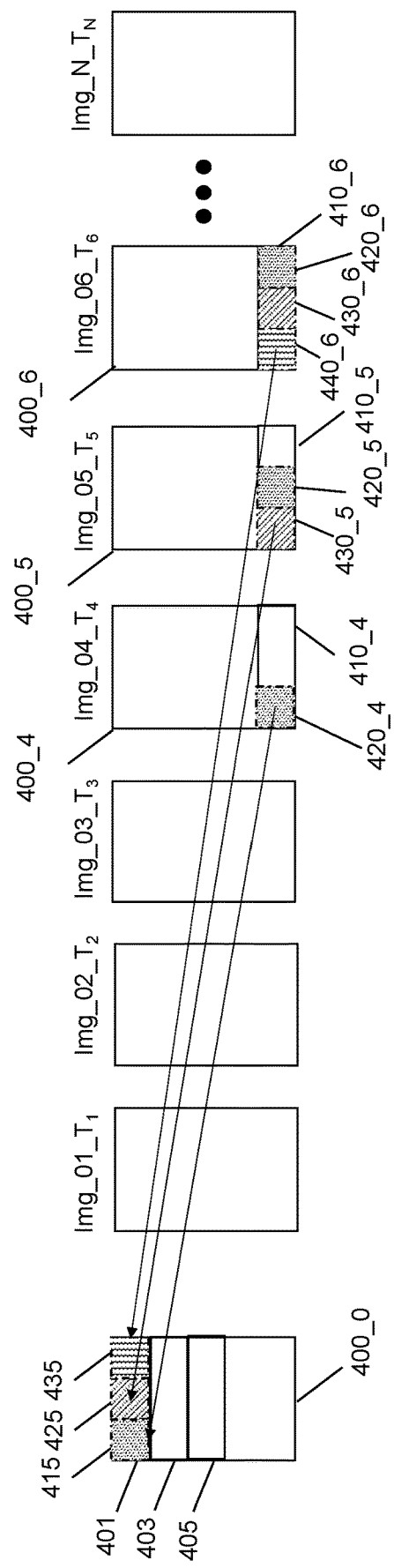
FIG. 4 illustrates the decoding of images of a group of pictures according to one or more embodiments.

FIG. 4 illustrates the decoding of images of a group of pictures according to one or more embodiments.

Shown on FIG. 4 is a group of pictures comprising N+1 images, among which a hidden image 400_0 followed by N images (Img_01_$T_1$, ..., Img_N_$T_N$). The hidden image 400_0 comprises a source pixel area 401, which comprises source pixel area blocks 415, 425, 435. In the set of N images of the illustrated GOP, images 400_4, 400_5 and 400_6 comprise respective target pixel areas 410_4, 410_5, and 410_6, each comprising respective target pixel area blocks.

In one or more embodiments, a user device (e.g. TV, smartphone, etc.) comprising a decoder configured to decode an encoded video bitstream (for example generated according to a video codec standard, such as AV1 or H.266/VVC, etc.) may receive an encoded video bitstream transmitted over a video distribution network (such as shown on FIG. 1), and processed using the proposed scheme according to one or more embodiments of the present subject disclosure. As described above, an encoded video bitstream is usually transported through the network using segments or chunks which carry media data corresponding to encoded images and corresponding metadata.

Media data carried by the segments or, as the case may be, chunks, may comprise data related to the encoding of images of the video sequence. For instance, media data carried by segments or chunks may typically carry data related to encoded groups of pictures, encoding parameters used for encoding the images of the groups of pictures, etc. In one or more embodiments, an encoded group of pictures may comprise one or several hidden images, and each hidden image of an encoded group of pictures may comprise one or several source pixel areas. Hidden images may be signaled to the decoder as specified by the video encoding scheme used for encoding the images of the group of pictures. For example, the group of pictures shown on FIG. 4 may comprise a hidden image 400_0 as the first image of the group of pictures, and signaling regarding the hidden image 400_0 may be provided to the decoder using the hidden image signaling specified for the video encoding scheme used for encoding the images of the group of pictures of FIG. 4.

In some embodiments, the decoding of the encoded video bitstream may be performed by a video decoder configured in a user device. The video decoder may be configured to obtain the groups of pictures comprising images of the set of images to be decoded for display on a display unit of the user device, except for any hidden image in the decoded groups of pictures. In some embodiments, the decoder may be informed, for example through received data related to encoded groups of pictures, that the hidden image 400_0 of the group of pictures of FIG. 4 is to be decoded, may also be used for the decoding of other images of the group of pictures, and is not to be displayed on the display unit of the user device. In one or more embodiments, the decoder may be configured to not include in a set of decoded images output by the decoder the hidden image 400_0 once decoded.

For example, as illustrated by FIG. 4, images Img_01_$T_1$, Img_02_$T_2$ and Img_03_$T_3$ of a group of pictures may be decoded based on the encoding parameters (division into blocks, prediction mode data (intra prediction, inter prediction, etc.), motion compensation data, pixel residual data, etc.) provided to the decoder, and displayed on a display or any suitable graphical user interface of the user device.

In one or more embodiments, the decoder may have received information regarding images 400_4, 400_5, and 400_6 of the group of pictures to be decoded that comprise one or more target pixel areas (Img_04_$T_4$, Img_05_$T_5$, Img_06_$T_6$ comprising respective target pixel areas 410_4, 410_5, 410_6 on FIG. 4), for example in the form of metadata related to these images of the group of pictures. In some embodiments, the decoding of these images of the group of pictures may comprise determining, for example based on the received encoding parameters, that the decoding of the respective target pixel areas of these images (Img_04, Img_05, and Img_06) is to be performed using an inter prediction mode based on the hidden image 400_0 of the group of pictures as a reference image.

Advantageously, as the encoding of blocks of the respective target pixel areas 410_4, 410_5, 410_6 of images comprising a target pixel area may have been configured such that a block of a target pixel area in an image is encoded according to a temporal correlation prediction mode pursuant to which no pixel residual is generated (such as, for example, a "skip" mode or alike), based on a motion vector pointing to a block of a source pixel area of the hidden image 400_0, the decoding of such blocks of the respective target pixel areas will be advantageously performed according to the temporal correlation prediction mode and based on the motion vector pointing to the hidden image used at the encoding side in a transparent manner for the decoder, that is, without any specific action besides decoding the block per the received encoding parameters for doing so.

In particular, the decoder may determine as part of the decoding of images of the group of pictures, based on received encoding parameters, that the decoding of the target pixel areas 410_4, 410_5, 410_6 in each of the images Img_04, Img_05, and Img_06 is to be performed using temporal prediction (e.g. an inter prediction mode) using the hidden image 400_0 as a reference image. More specifically, the decoder may be directed to reconstruct blocks comprised in a respective target pixel area 410_4, 410_5, 410_6 of images Img_04 Img_05, and Img_06 using motion prediction data (e.g. motion vectors) pointing to a source pixel area 401 of the hidden image 400_0.

As illustrated on FIG. 4, the hidden image 400_0 may comprise one or several source pixel areas 401, 403, 405. For example, the source pixel area 405 may be relative to a first advertising to be incrusted in images of the GOP, and the source pixel areas 401 and 403 may be relative to a second advertising to be incrusted in images of the GOP.

As the encoded data bitstream received by the decoder does not include pixel residual data related to the encoding of blocks of target pixel areas 410_4, 410_5, 410_6, the decoder may, during decoding of such a block, based on a motion vector received for such block, directly copy the block of the source pixel area 401 indicated by the motion vector, and paste such block of the source pixel area 401 of the hidden image 400_0 in the target pixel area 410_4, 410_5, 410_6 at the location of the block undergoing decoding in the image Img_04, Img_05, and Img_06.

For example, as illustrated by FIG. 4, the respective blocks 420_4, 420_5, 420_6 of the target pixel areas 410_4, 410_5, 410_6 in the images Img_04, Img_05, and Img_06 may be reconstructed using a motion vector pointing to the block 415 of the source pixel area 401 in the hidden image 400_0.

In some embodiments, for the blocks in the target pixel areas 410_4, 410_5, 410_6 located on the right of the blocks 420_4 and 420_5 in the images Img_04 and Img_05, respectively, if there is no defined motion vector towards a source pixel area in a hidden image, the decoder may use conventional predictions.

Likewise, second blocks 430_5 and 430_6 of the target pixel areas in the images Img_05 and Img_06, respectively, may for example be reconstructed using a motion vector pointing to a second block 425 of the source pixel area 401 in the hidden image 400_0. Further, a third block 440_6 of the target pixel area 410_6 in Img_06 may be reconstructed using a motion vector pointing to a third block 435 of the source pixel area 401 in the hidden image 400_0. Therefore, the sequence of decoded images Img_04 Img_05, and Img_06 displayed on the screen of the user device may be perceived by a user as a banner scrolling from left to right.

In some embodiments, the same motion vector may be used to encode a plurality of the blocks, or all of the blocks of target pixel areas of one or a plurality of images Img_04 Img_05, and Img_06 of the group of pictures. For example, in some embodiments, an entire source pixel area 401 of the hidden image 400_0 may be copied in the respective target pixel area 410_4, 410_5, 410_6 of images Img_04 Img_05, and Img_06 of the group of pictures. In this case, the image content displayed in the target pixel area will be identical for images Img_04 Img_05, and Img_06.

For example, during a broadcast sport event such as the football World Cup, a content editor producing video sequences of different football matches may encode them with a hidden image (or several hidden images) in order to provide a video sequence with one or more target pixel areas in some or all of the images of the set of images of a video sequence. The content editor may then distribute the encoded video sequence to different video distributors, for example covering distribution in respective countries, for local video distribution. Upon receiving the video sequence, a local distributor may decode the video sequence, generate a derived video sequence with custom hidden images replacing the hidden images originally comprised in the video sequence, and then re-encode the derived video sequence for local distribution. Advantageously, the local distributor may therefore customize the hidden images inserted in the derived video sequence, possibly based on the original hidden images of the received video sequence, in order to personalize or customize the video sequence as it appears to viewers when played on a user device, for example by inserting in images of the video sequence custom visual features.

Figure 5A:
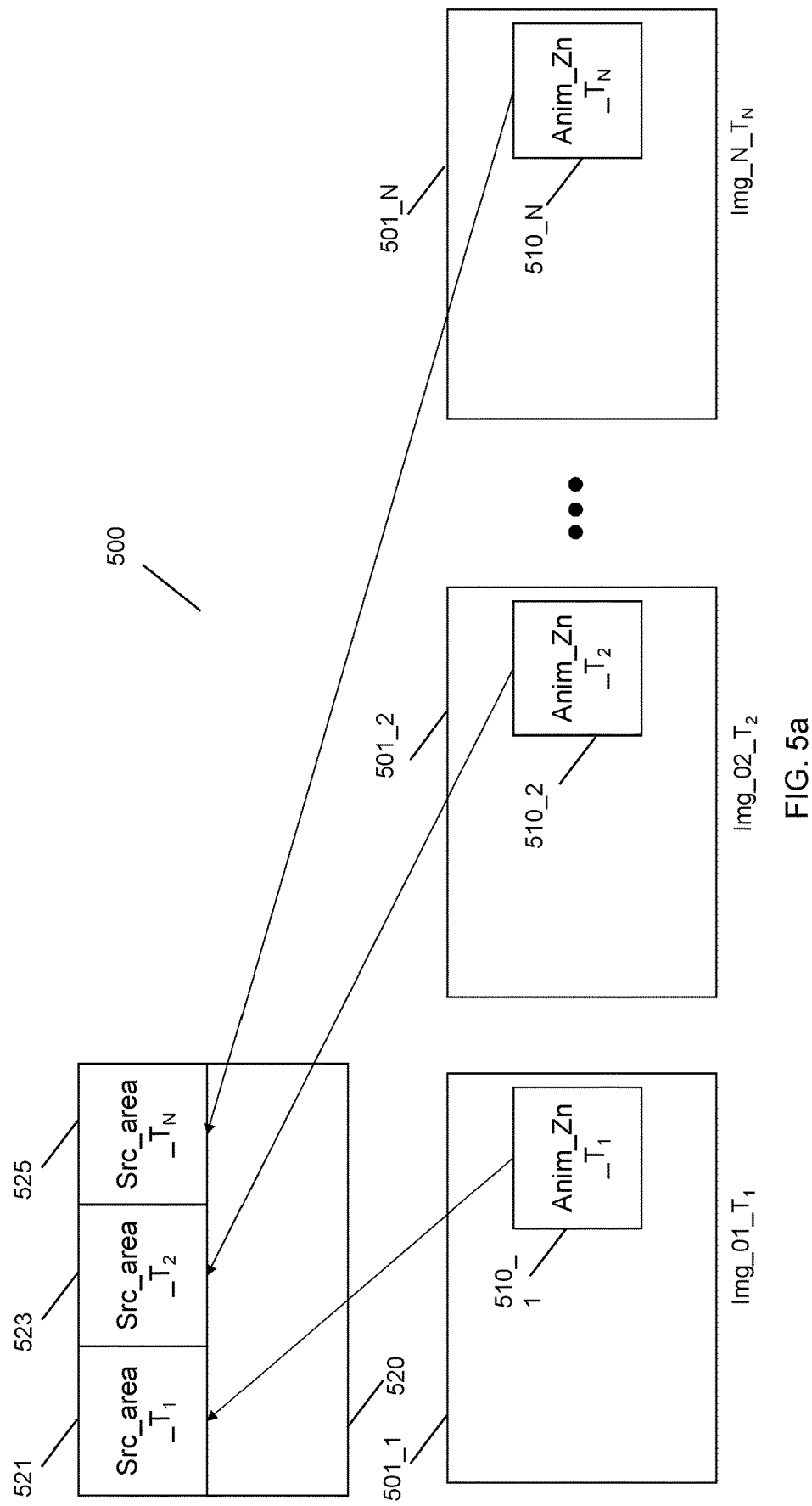
FIGS. 5a and 5b illustrate an exemplary embedding of an animated target pixel area in images of a video sequence.
Figure 5B:
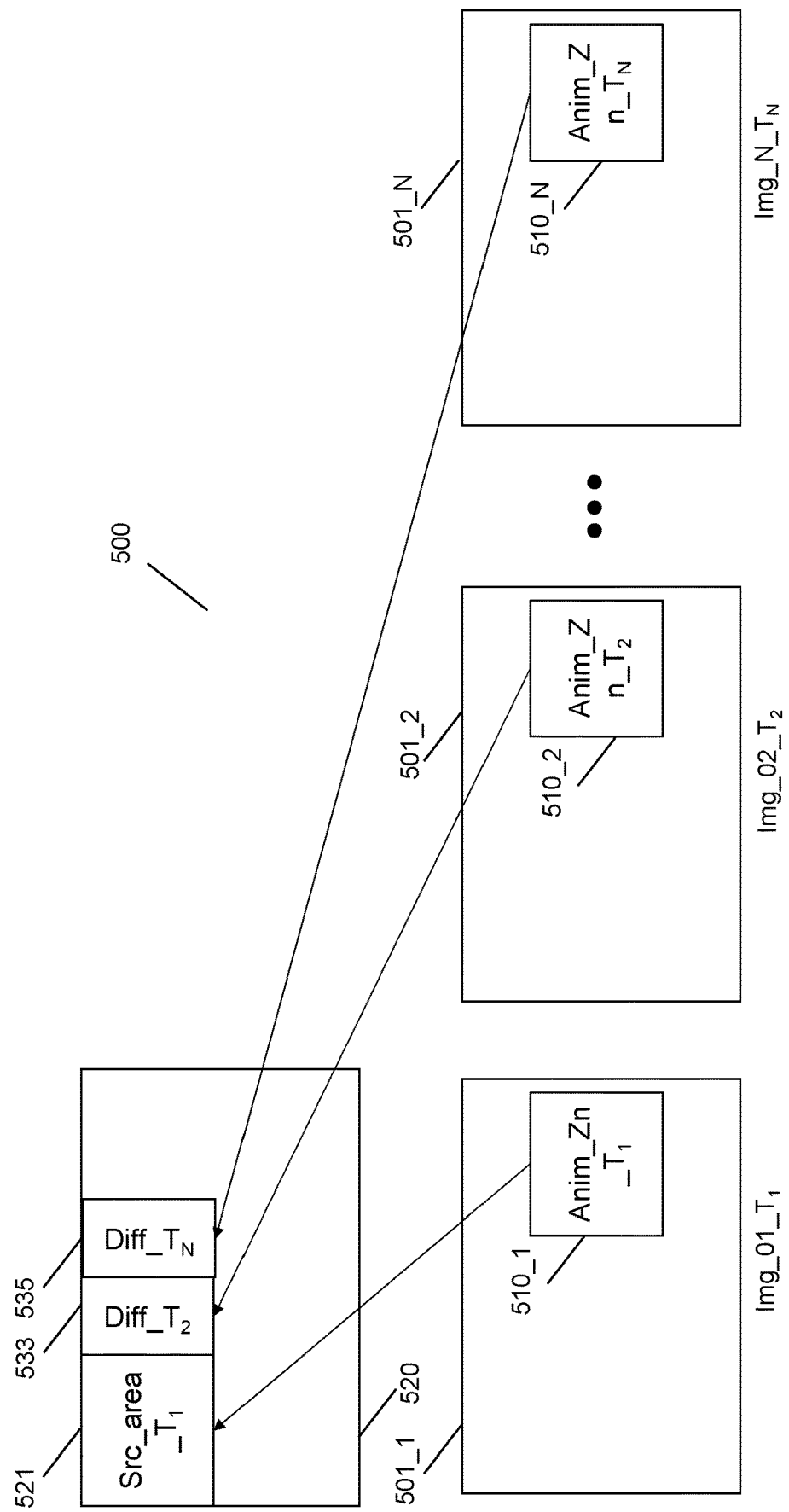

FIGS. 5a and 5b illustrate an exemplary embedding of an animated target pixel area in images of a video sequence.

In one or more embodiments, a user device (e.g. TV, smartphone, etc.) comprising a decoder configured to decode an encoded video bitstream (for example generated according to a video codec standard, such as AV1 or H.266/VVC, etc.) may receive an encoded video bitstream transmitted over a video distribution network (such as shown on FIG. 1), and processed using the proposed scheme according to one or more embodiments of the present subject disclosure.

The proposed scheme may indeed be used, depending on the embodiment, to incrust content in a video sequence that will be perceived as still or moving by viewers. A target pixel area in one or more hidden images may therefore be configured in some embodiments to be eventually displayed as moving content (e.g. as an animated banner, a scrolling banner, etc. for weather alerts, breaking news, etc.) to viewers of the video sequence.

Shown on FIG. 5a is an exemplary video sequence 500 comprising images 501_1, 501_2, . . . , 501_N (Img_01_$T_1$, Img_02_$T_2$, . . . , and Img_N_$T_N$), that a decoder of a user device may receive. Images 501_1, 501_2, . . . , 501_N (Img_01_$T_1$, Img_02_$T_2$, . . . , and Img_N_$T_N$) of the video sequence 500 may each comprise a target pixel area 510_1, 510_2, . . . , 510_N (or an animated target pixel area). The encoding of blocks of respective target pixel areas may be configured to use motion vectors that point to corresponding blocks in respective source pixel areas 521, 523, 525 of a hidden image 520 of the video sequence 500. Each source pixel area of the hidden image may be configured to correspond to a display time in a time sequence of display of the animation. For instance, the source pixel area 521 (Src_area_$T_1$) may be configured to correspond to the animation at instant $T_1$ of the animation in the image 501_1 (Img_01_$T_1$), the source pixel area 523 (Src_area_$T_2$) may be configured to correspond to the animation at instant $T_2$ (with $T_2>T_1$) of the animation in the image 501_2 (Img_02_$T_2$), and the source pixel area 525 (Src_area_$T_N$) may be configured to correspond to the animation at instant $T_N$ (with $T_N>T_{N-1}> \ldots >T_2>T_1$), etc.

Therefore, in some embodiments, during reconstructing of the sequence of images Img_01_$T_1$, Img_02_$T_2$, Img_N_$T_N$ of the video sequence, one or more blocks of the animated target pixel area 510 common to images Img_01_$T_1$, Img_02_$T_2$, ..., Img_N_$T_N$ following each other in the video sequence may be decoded based on corresponding blocks in respective source pixel areas (source pixel areas Src_area_$T_1$, Src_area_$T_2$, ..., Src_area_$T_N$ respectively corresponding to images Img_01_$T_1$, Img_02_$T_2$, ..., Img_N_$T_N$) of a hidden image 520 of the video sequence. For instance, blocks of the animated target pixel area 510_1 (Anim_Zn_$T_1$) in the image Img_01_$T_1$ may be determined from corresponding blocks of the source pixel area 521 (Src_area_$T_1$) in the hidden image 520, blocks of the animated target pixel area 510_2 (Anim_Zn_$T_2$) in the image Img_02_$T_2$ may be determined from corresponding blocks of the source pixel area 523 (Src_area_$T_2$) in the hidden image 520, and blocks of the animated target pixel area 510_N (Anim_Zn_$T_N$) in the image Img_N_$T_N$ may be determined from corresponding blocks of the source pixel area 525 (Src_area_$T_N$) in the hidden image 520.

FIG. 5b describes another exemplary of animation incrusted in one or several images. As mentioned for the exemplary embodiment illustrated by FIG. 3, one or several images of the animation may be reconstructed from a source pixel area defined as corresponding to a difference with another source pixel area or with a target pixel area of an image preceding the current image in the sequence of images. For instance, blocks of the animated target pixel area 510_1 in the image (Img_01_$T_1$) may be determined from corresponding blocks of the source pixel area 521 (Src_area_$T_1$) in the hidden image 520. A block of the animated target pixel area (Anim_Zn_$T_2$) 510_2 in the image Img_02_$T_2$ may be predicted from a difference (e.g. motion difference) between a block of the animated target pixel area (Anim_Zn_$T_1$) 510_1 in the image (Img_01_$T_1$) and a block of the source pixel area 533 (Diff_$T_2$). Likewise, a block of the animated target pixel area (Anim_Zn_$T_N$) 510_N in the image (Img_N_$T_N$) may be predicted from a difference (e.g. motion difference) between a block of the animated target pixel area 510_1 in the image (Img_01_$T_1$) or a block of the animated target pixel area 510_2 in the image (Img_02_$T_2$) and a block of the source pixel area 535 for instance. In one or several embodiments, the source pixel areas 533 and/or 535 may present a lower resolution compared to source pixel area 521. Such disposition may advantageously allow using one or more hidden images with a reduced bitrate.

In one or several embodiments, a plurality of hidden images may be used for reconstructing an animation of a target pixel area.

The change of the pointing toward another source pixel area in the hidden image may be at the image rate of the video sequence or at a customer rate.

Figure 6:
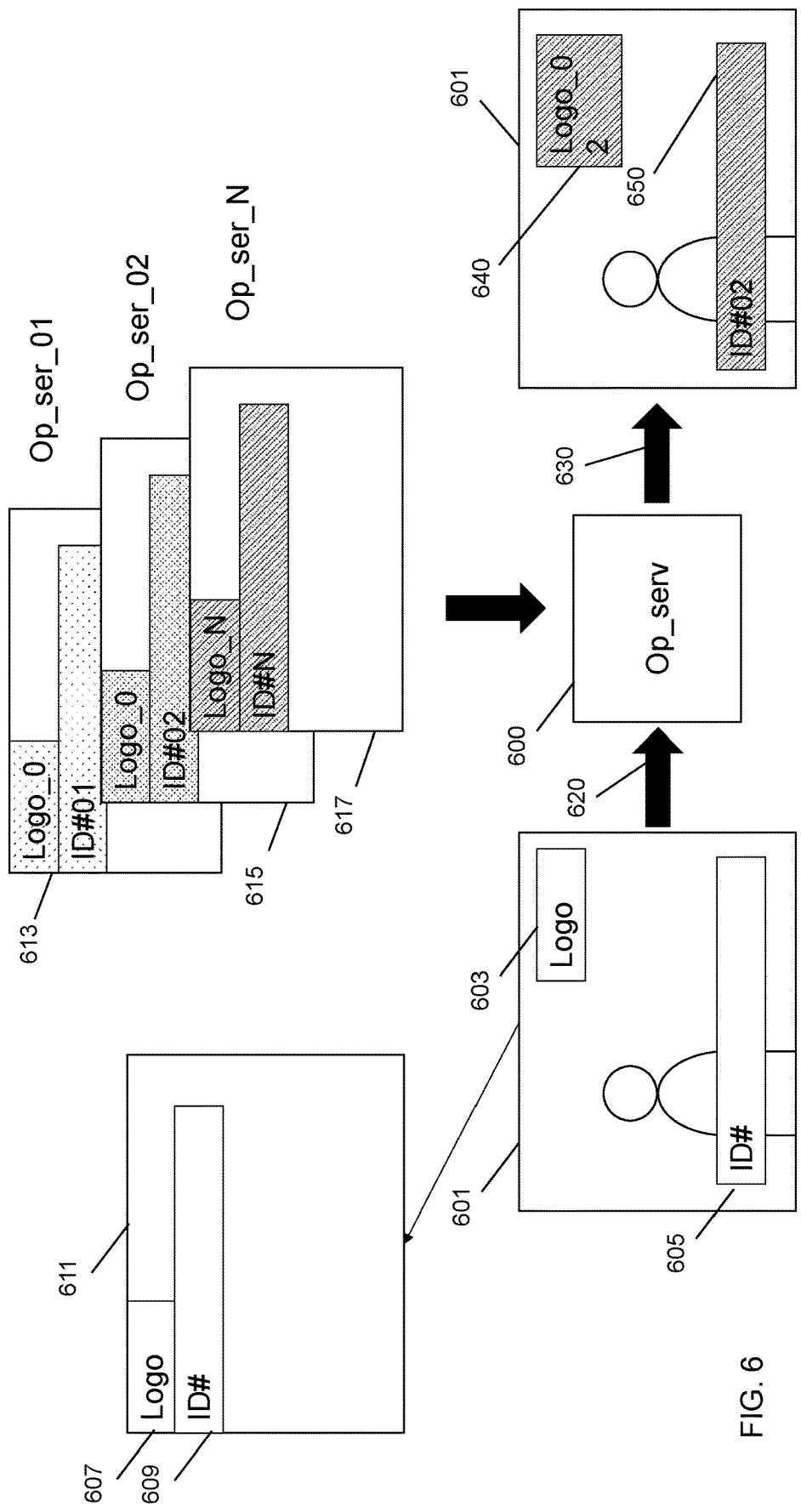
FIG. 6 shows an exemplary personalization of images of a video sequence according to one or more embodiments.

FIG. 6 shows an exemplary personalization of images of a video sequence according to one or more embodiments.

Referring to FIG. 6, a service operator or video distributor 600 distributing a video sequence (or video content, media content or the like) provided by a content editor may desire to personalize the video sequence before distribution to viewers. For instance, the service operator may desire to integrate custom visual content in the video sequence before distributing the video sequence.

A video sequence 601 may be provided to one or several service operators 600 for further distribution to viewers.

In one or more embodiments, the video sequence 601 received by the service operator 600 may be pre-configured for personalizing by the service operator 600. In some embodiments, the pre-configuration may be performed by a content editor before providing the encoded video sequence to service operators, and may comprise inserting one or several generic target pixel areas 603, 605 in images of the video sequence 601 for customization, for example by service operators 600, according to one or more embodiments of the present subject disclosure, through use of one or more hidden images with customized source pixel areas. In some embodiments, the pre-configuration may comprise providing metadata related to one or several target pixel areas 603, 605 in images of the video sequence 601 for customization, for example by service operators 600, according to one or more embodiments of the present subject disclosure. Accordingly, customized target pixel areas may be obtained through the encoding of the target pixel areas using one or more hidden images of the video sequence.

As illustrated on FIG. 6, one or more images of the video sequence may comprise a first target pixel area 603 and a second target pixel area 605 encoded using a temporal correlation prediction using a hidden image 611 as a reference image, with motion vectors determined for blocks of the target pixel area 603 respectively pointing to corresponding blocks of a first source pixel 607 of the hidden image 611, and motion vectors determined for blocks of the target pixel area 605 respectively pointing to corresponding blocks of a second source pixel area 609 of the hidden image 611. Depending on the embodiment, one or several target pixel area(s) may be customized in one or several images of the set of images of the video sequence by using one or several hidden images.

Referring to FIG. 6, the first target pixel area 603 may be used to display a custom logo, such as for instance the logo of the service operator or the logo of a television channel. The second target pixel 605 may be configured as a customizable visual bar specific to the service operator or to the television channel.

In one or more embodiments, a plurality of service operators 600 (OP_ser_01, OP_ser_02, ..., OP_ser_N) may receive 620 the video sequence 601, and decode the received video sequence. Each service operator may then reencode the decoded video sequence. The re-encoding of the video sequence by each service operator 600 (OP_ser_01, OP_ser_02, ..., OP_ser_N) may advantageously allow each service operator 600 (OP_ser_01, OP_ser_02, ..., OP_ser_N) to perform a customized use of the target pixel areas 603, 605 included in images of the video sequence 601, through use of respective customized hidden images 613, 615, 617 for the re-encoding of the video sequence according to the proposed scheme. For example, a first service operator Op_ser_01 may use a first hidden image 613 for re-encoding the video sequence using the proposed scheme, a second service operator Op_ser_02 may use a second hidden image 615 for re-encoding the video sequence using the proposed scheme, and a third service operator Op_ser_03 may use a third hidden image 617 for re-encoding the video sequence using the proposed scheme.

In some embodiments, a service operator Op_ser_01, Op_ser_02, Op_ser_N may replace the original hidden image 611 of the video sequence for customization of target pixel area(s) 603, 605 of images of the video sequence with a customized hidden image 613, 615, 617 which may advantageously be chosen with one or more features (such as size, resolution, shape, etc.) common with the original hidden image 611. Using a customized hidden image 613, 615, 617 which shares common features with the original hidden image 611 may indeed advantageously simplify the implementation of the proposed scheme.

In other embodiments, the encoding scheme used to encode the images of the video sequence may support temporal correlation prediction with reference images of a size different from the size of the images to be encoded. In such embodiments, features of the original hidden image 611 such as the size may be different from corresponding features of the customized hidden image 613, 615, 617.

In some embodiments, features of the source pixel area(s) of the customized hidden image 613, 615, 617, such as for example the size, the shape, and/or the location in the hidden image may also advantageously be chosen common with corresponding features of the source pixel area(s) of the original hidden image 611.

In one or more embodiments, a service operator Op_ser_01, Op_ser_02, . . . , Op_ser_N may obtain metadata related to one or more features of the hidden image(s) 611 comprised in the received video sequence and usable for customization of images of the video sequences, and/or metadata related to one or more features of the one or more source pixel areas 603, 605 comprised in such hidden image(s) 611. In some embodiments, all or part of these metadata may be comprised in the received encoded bitstream. In other embodiments, all or parts of these metadata may be provided to the service operator Op_ser_01, Op_ser_02, . . . , Op_ser_N through other channels, such as, for example, through configuration data provided to the service operator Op_ser_01, Op_ser_02, . . . , Op_ser_N.

As illustrated by FIG. 6, in some embodiments, service operator Op_ser_02 may customize the received video sequence through replacing the original hidden image 611 with a customized hidden image 615 before reencoding the video sequence for distribution to its viewers 630. The customized hidden image 615 used by service operator Op_ser_02 may comprise source pixel areas sharing common features, such as size, shape and location with respectively corresponding source pixel areas 607, 609 of the original hidden image 611. Once re-encoded using the customized hidden image 615, images of the video sequence 601 may be provided 630 to a user device. Such user device may decode the images, also using the customized hidden image 615 as instructed by the video bitstream generated by the reencoding of the video sequence and received by the user device, and may display visual features of service operator Op_ser_02, such as a logo 640 and a custom visual bar 650, incrusted in images of the displayed video sequence 601, as illustrated in the right hand-side of FIG. 6.

Figure 7:
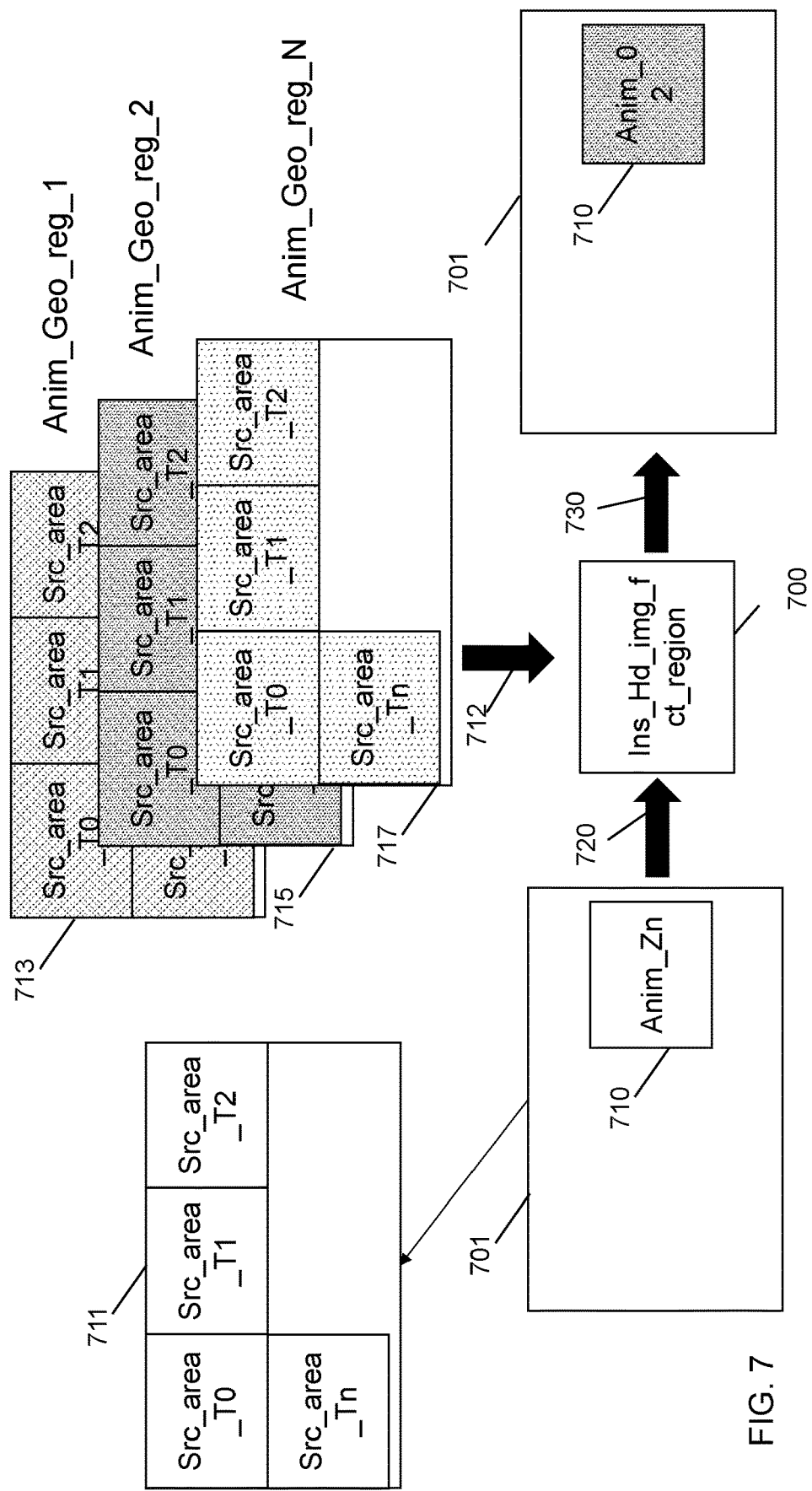
FIG. 7 shows, in one or several embodiments, an example of source pixel as a function of the geographic distribution of a video sequence.

FIG. 7 shows, in one or several embodiments, an example of source pixel as a function of the geographic distribution of a video sequence.

For instance, the service operator or content editor may want to integrate one or several target pixel areas intended to display animation in the video sequence depending on respective geographical criteria. More precisely, it may be desired to display an animation with a content which would change as a function of where the video sequence (or video stream) is distributed.

For instance, a car seller and/or a phone seller may desire to advertise their products for the clients comprised in their respective geographic region.

Thus, a service operator or a television channel (or a content editor) distributing a video sequence (or video content) provided by a content editor (according to the embodiment of FIG. 1) may desire to add animation (or animated video sequence) for which the theme of the animation would be different as a function of the geographic distribution of the video sequence (or as a function of the geographical region where the video sequence is intended to be displayed) or as a function of the location of the third-party device receiving the video sequence.

As already discussed with respect to embodiments described above, in order to allow the customization of the video sequence 701, before transmitting the encoded video sequence, a content editor may insert one or several animated target pixel area in the video sequence for service operators by using a hidden image (or several hidden images) according to the method described with respect to FIG. 3.

For instance, the video sequence 701 may comprise an animated target pixel area 710 obtained by a respective pointing toward a plurality of source pixel areas of a hidden image 711 comprised in the video sequence as described with respect to FIG. 4 or FIG. 5.

Thus, a service operator or a television channel 700 receiving 720 the video sequence 701 may decode and reencode it by replacing 712 the original hidden image 711 by its own hidden images 713, 715, 717 and as a function of where the video sequence is intended to be distributed.

For instance, for a geographical region 2 (Anim_Geo_reg_2) where the video sequence is distributed, the service operator may replace the original hidden image 711 by the hidden image 715 corresponding to an animation for the geographic region 2 (Anim_Geo_reg_2). The hidden image 715 may comprise the source pixel areas intended to be used for reconstructing the animation in the target pixel animated area 710 as described at FIG. 5.

A third-party device located in the geographic region 2 (Anim_Geo_reg_2) receiving 730 from the service operator the video sequence 701 which comprise the hidden image 715 different from the original hidden image 711 may decode and display the video sequence with the animated target pixel area 710 playing the animation of the hidden image 715.

In some embodiments, the service operator may need to know the location and size of the source pixel areas in the hidden image in order to avoid visual artifact.

In one or several embodiments, several hidden images comprising each several source pixel areas may be used to reconstruct one or several animations in one or several animated target pixel areas.

Figure 8:
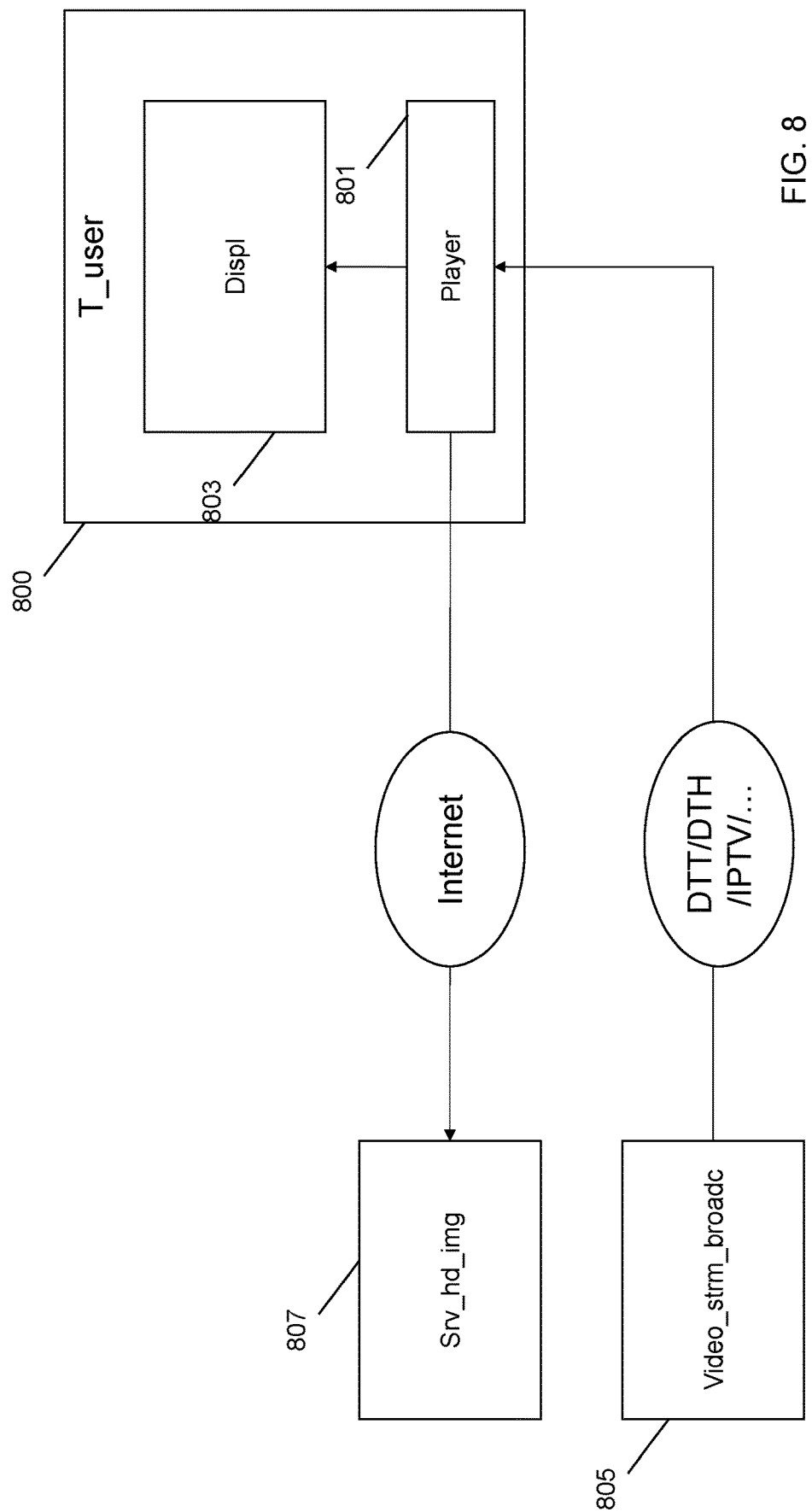
FIG. 8 shows an exemplary personalization of images of a video sequence according to one or more embodiments.

FIG. 8 shows an exemplary personalization of images of a video sequence according to one or more embodiments.

Shown on FIG. 8 is a user device (or client device) 800 comprising one or more processors operatively coupled with one or more memory units (not shown on the figure), and operatively coupled with a video player unit 801, which may comprise a video decoder unit (not shown on FIG. 8). The user device 800 may also comprise a graphical user interface unit 803 configured for displaying video sequences decoded by the video decoder unit on a display of the user device 800. The video decoder unit may be configured to decode received encoded video bitstreams encoded according to one or more video encoding/decoding schemes (such as the VVC and AV1 video codec standards) supported by the video player unit 801.

The video player unit 801 may be configured to receive an encoded video bitstream 805 encoded according to one or more embodiments of the present subject disclosure. The encoded video bitstream 805 may be transmitted to the user device 800 through one or more data communication network such as, for example, the Internet network as illustrated on FIG. 8, using conventional video distribution schemes (e.g. DTH for "Direct to Home", DTT for "Digital Direct Television", IPTV for "Internet protocol Television", etc.).

In one or more embodiments, the video sequence 805 received by the user device 800 may be pre-configured for personalizing by the user device 800, for example based on a user profile. In some embodiments, the pre-configuration may be performed by a content editor, a service operator, a content provider, or a video distributor, and may comprise inserting one or several target pixel areas in images of the video sequence for customization by the user device according to one or more embodiments of the present subject disclosure, and/or providing to the user device metadata related to one or several target pixel areas in images of the video sequence for customization by the user device according to one or more embodiments of the present subject disclosure.

In one or more embodiments, the video player unit 801 of the user device 800 may be configured to obtain a user profile, such as, for example, through a secure access to a database comprising user profile data. The user profile may comprise data related to user preferences (e.g. TV, food, hobbies, type of news, etc.), user habits, and/or user personal data (e.g. address).

In one or more embodiments, the video player unit 801 of the user device 800 may receive an encoded video bitstream 805, and the video decoder unit may decode the received encoded video bitstream. In some embodiments, the video decoder unit may be configured to obtain from the encoded video bitstream metadata indicating one or several hidden images included in the encoded video sequence. In other embodiments, the metadata may indicate that one or several hidden images included in the encoded video sequence may be used to customize images of the video sequence to be displayed once decoded by the graphic user interface unit of the user device. In embodiments where a media data transport protocol, such as the Dynamic Adaptive Streaming over HTTP (DASH) protocol or the HTTP Live Streaming (HLS) protocol, is used for transmitting the encoded video bitstream to the user device, for example in segments and/or chunks, the metadata may indicate that one or several hidden images usable to customize one or several target pixel areas in images of the video sequence will be present in the next transmitted segments and/or chunks.

In one or more embodiments, based on the obtained metadata indicating the presence of hidden image(s) in received segments and/or chunks, the video player 801 may retrieve from the memory of the user device or from a distant server 807 one or several user-specific hidden images to be used during the decoding of the received encoded video bitstream to replace hidden images comprised in the received encoded video sequence.

The user-specific hidden image(s) may comprise content relative to the profile of the user. For instance, the user-specific hidden image(s) may comprise content relative to the food preferences of the user or relative to the type of news (e.g. financial, high-tech, etc.). In some embodiments, the content may be relative to one several stores located around the location of the user (i.e. around the location of the third-party device), etc.

When receiving and starting to decode the segments with hidden images used to display target pixel area(s), the video player 801 may replace the original hidden image(s) with the user-specific hidden image(s) relative to the profile of the user of the user device 800.

Accordingly, in some embodiments, when images comprising one or several target pixel areas are displayed by the video player 801 on the display 803 of the user device 800, a viewer may be presented images of the video sequence that are personalized according to the user profile, for example with specific news (e.g. high-tech news) or/and specific advertising.

Figure 9:
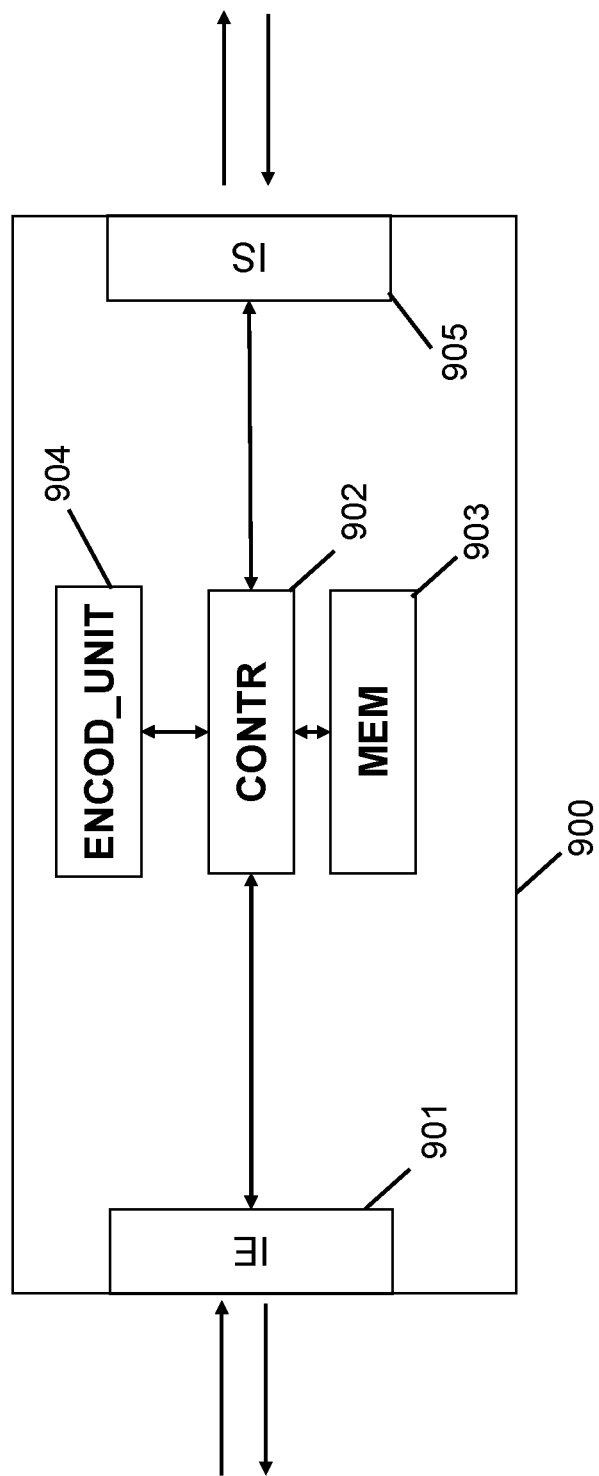
FIG. 9 shows an exemplary architecture of a device configured for implementation of a method for image processing in one or more embodiments.

FIG. 9 illustrates an exemplary architecture of a device configured for the implementation of embodiments of the proposed scheme.

Depending on the embodiment, the architecture proposed below may be used for the encoder 101 of FIG. 1, or for a video processing unit comprising a processor implementing embodiments of the proposed scheme.

With reference to FIG. 9, the device 900 may comprise a controller 902, operatively coupled with an input interface 901, an output interface 905 and a memory 903, which may be configured to control an encoding unit 904 for encoding of images of the video sequence.

The input interface 901 may be configured to receive as input a set of images corresponding to a video sequence or a live distributed video stream. The input interface 901 may also be configured to receive one or several hidden images, and/or to receive metadata which may comprise data (e.g. encoding parameters) to encode the set of images. Such metadata may further comprise data relative to one or several target pixel areas configured for one or several images of the set of images. The received hidden images may comprise one or several source pixel areas which are intended to be used for the encoding of one or several target pixel areas in the images of the set of images (of the video sequence).

The controller 902 may be configured to control the encoding unit 904 for the implementation of one or more embodiments of the proposed method.

The encoding unit 904 may be configured to perform encoding of residual as well as hidden image(s) and metadata.

The device 900 may be configured to implement one or more embodiments of the proposed method for processing an image in a set of image. In particular, the device 900 may be configured for: determining a target pixel area in the current image; obtaining a hidden image of the set of images, the hidden image comprising a source pixel area; dividing the current image into blocks for the encoding of the blocks of the current image according to an encoding sequence; and for a block of the target pixel area of the current image: determining a motion vector pointing to a block of the source pixel area in the hidden image corresponding to the block of the target pixel area, and based on the motion vector, encoding the block according to a temporal correlation prediction mode pursuant to which no pixel residual representing a difference between the block and the corresponding block of the target pixel area is generated.

The device 900 may be a computer, an encoder (such as, for example, the encoder 101 of FIG. 1), a computer network, an electronic component, or another device comprising a processor operatively coupled with a memory, as well as, depending on the embodiment, a storage unit, and other associated hardware elements such as a network interface and a media drive for reading and writing to removable storage media (not shown in the figure). Depending on the embodiment, the memory, the data storage unit or the removable storage medium contains instructions which, when executed by the controller 902, cause this controller 902 to perform or control the interface parts of input 901, the memory 903, the encoding unit 904, and the output interface 905, encoding of image and/or data processing of the examples of implementation of the proposed method described herein. The controller 902 may be a component implementing a processor or a calculation unit for encoding hidden images and image of a set of images of a video sequence according to the proposed method and the control of units 901, 902, 903, 904, 905, of device 900.

The device 900 may be implemented in software, as described above, or in hardware, such as an application specific integrated circuit (ASIC), or in the form of a combination of hardware and software, such as for example a software program intended to be loaded and executed on a component of FPGA (Field Programmable Gate Array) type.

Figure 10:
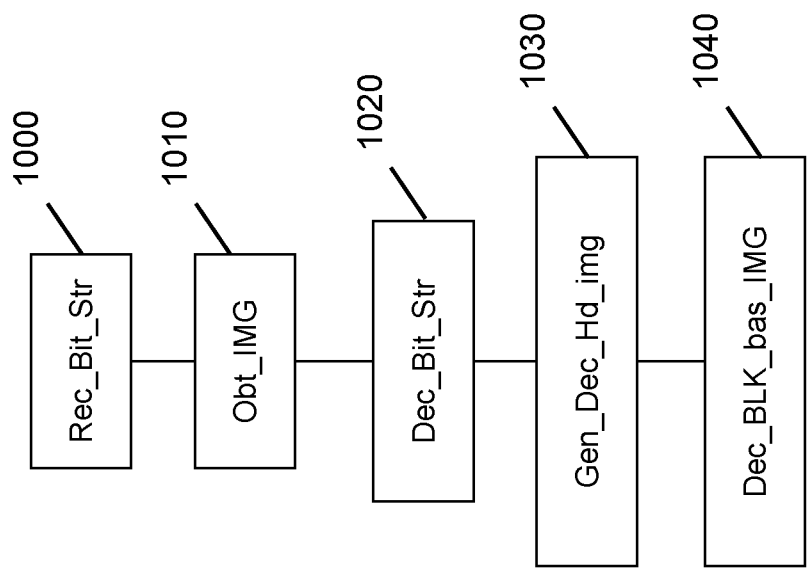
FIG. 10 shows a flow chart of a method for processing an encoded video bitstream at a video processing unit comprising a processor in one or more embodiments.

FIG. 10 shows a flow chart of a method for processing an encoded video bitstream at a video processing unit comprising a processor in one or more embodiments.

A third-party device (e.g. smartphone, TV, tablet, etc.) may receive encoded stream data 1000. The third-party device may comprise a video player coupled to the decoder (of the third-party device) to decode and display the encoded stream data. This encoded stream data (or encoded bitstream) may be encoded according to the method for processing a current image of a set of images. area. For instance, the encoded stream data may have been obtained from a video processing unit implementing the method proposed method. The encoded bitstream may be transmitted by one or several segments as mentioned previously, each segment comprising one or several groups of pictures.

The video player may obtain an image 1010. In one or several embodiments, the image may be obtained over the network from one or several distance servers and stored in the memory of the third-party device.

In one or several embodiments, the video player may further obtain metadata comprising information related to a hidden image comprising a source pixel area, the hidden image being comprised in the encoded bitstream. For instance, the video player may use the decoder of the third-party device for obtaining from the received segment comprising the encoded stream the metadata. According to an example, the metadata may be implemented by using the DASH protocol using a custom box or carrying video segments with private SEI messages.

The video player by using the decoder may then decode 1020 the encoded video bitstream as follow: generating 1030 a decoded hidden image of a set of images, based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding 1040 the block of the target pixel area of the current image using a block of the image instead of the block of the source pixel area in the decoded hidden image.

Therefore, it may be possible to replace a generated hidden image by an image (e.g. hidden image) in order to modify in a simple way the content of a target pixel area, as described with the example of FIG. 8.

In one or several embodiments, the size of the obtained image 1010 and the size (or the resolution) of the generated hidden image 1030 may be similar.

Figure 11:
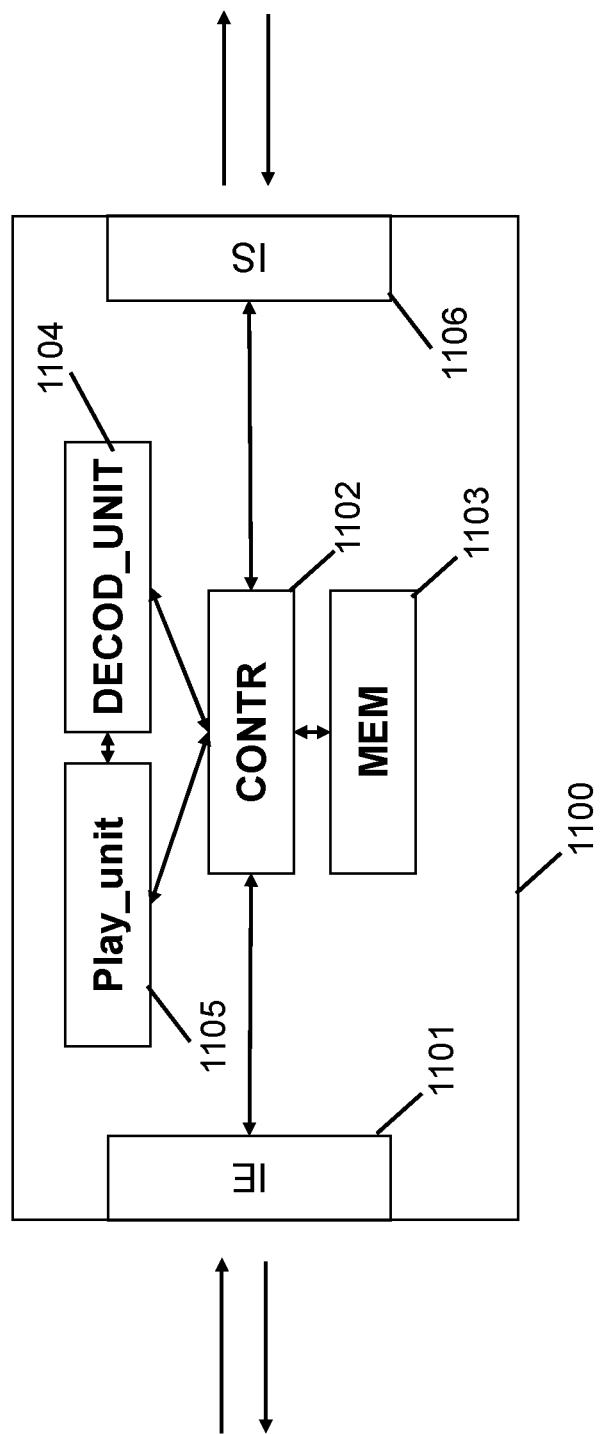
FIG. 11 shows an exemplary architecture of a device configured for implementation of method for processing an encoded video bitstream in one or more embodiments.

FIG. 11 shows an exemplary architecture of a device configured for implementation of method for processing an encoded video bitstream in one or more embodiments.

In one or several embodiments, the architecture proposed below may be used in any user device configured with a video player comprising a video decoding unit (e.g. smartphone, tablet, TV, etc.) configured for implementing the proposed method for processing an encoded video bitstream.

With reference to FIG. 11, the device 1100 may comprise a controller 1102, operatively coupled with an input interface 1101, an output interface 1106 and a memory 1103, which may be configured to control a video player unit 1105 comprising a decoder unit 1104 for decoding of images of the received encoded video bitstream. The output interface may be connected to a display unit of the device for displaying images output by the video player unit 1105.

The input interface 1101 may be configured to receive as input an encoded video bitstream corresponding to a video sequence or a live distributed video stream. The encoded video bitstream may be received at the input interface through a sequence of segments and/or chunks. The input interface 1101 may also be configured to receive one or several hidden images from a distance server. The video player unit 1105 may be configured for, based on metadata comprised in the received encoded video bitstream (in the segment or chunks), obtain image data to be used as one or more hidden images during the decoding of the encoded video bitstream by the decoder unit. The image data may correspond to one or more images each comprising one or several source pixel areas.

The controller 1102 may be configured to control the video player unit 1105 and the decoding unit 1104 for the implementation of one or more embodiments of the proposed method for processing an encoded video bitstream.

The device 1100 may be configured to implement one or more embodiments of the proposed method for processing an encoded video bitstream. In particular, the video player unit 1105 may be configured for: receiving the encoded video bitstream, wherein the encoded video bitstream comprises data representing the encoding of a current image in a set of images, obtaining an image; decoding the encoded video bitstream, the decoding comprising: generating a decoded hidden image of a set of images, based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image.

The device 1100 may be a computer, a video codec, a computer network, an electronic component, or another device comprising a processor operatively coupled with a memory, as well as, depending on the embodiment, a storage unit. data, and other associated hardware elements such as a network interface and a media drive for reading and writing to removable storage media (not shown in the figure). The removable storage medium can be, for example, a compact disc (CD), a digital video/versatile disc (DVD), a flash disc, a USB stick, etc. Depending on the embodiment, the memory, the data storage unit or the removable storage medium contains instructions which, when executed by the controller 1102, cause this controller 1102 to perform or control the interface parts of input 1101, the video player unit 1105, the decoding unit 1104, decoding of image and/or data processing of the examples of implementation of the proposed method described herein. The controller 1102 may be a component implementing a processor or a calculation unit for processing an encoded video bitstream according to the proposed method and the control of units 1101, 1102, 1103, 1104, 1105, 1106 of device 1100.

In addition, the device 1100 may be implemented in software, as described above, or in hardware, such as an application specific integrated circuit (ASIC), or in the form of a combination of hardware and software, such as for example a software program intended to be loaded and executed on a component of FPGA (Field Programmable Gate Array) type.

While the examples herein have been described with respect to preferred embodiments, those skilled in the art will readily appreciate that various changes and/or modifications can be made to the invention without departing from the spirit or scope of the present subject-disclosure as defined by the appended claims.

Although this present disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method for processing a current image of a set of images, the method comprising, at a video processing device comprising a processor:
   determining a target pixel area in the current image;
   obtaining a hidden image of the set of images, the hidden image comprising a source pixel area;
   dividing the current image into blocks for encoding of the blocks of the current image according to an encoding sequence; and
   for a block of the target pixel area of the current image:
      determining a motion vector pointing to a block of the source pixel area in the hidden image corresponding to the block of the target pixel area, and
      based on the motion vector, encoding the block of the target pixel area according to a temporal correlation prediction mode pursuant to which no pixel residual representing a difference between the block of the target pixel area and the corresponding block of the source pixel area is generated,
   wherein the hidden image and the current image are images of the set of images of a video sequence to be encoded according to a video encoding scheme,
   the method further comprising:
      obtaining metadata defining the target pixel area in the current image, wherein the obtained metadata indicates that the hidden image included in the encoded video sequence is usable to customize the current image, and
      including the metadata in metadata describing the encoded video sequence.

2. The method according to claim 1, wherein the metadata comprise source pixel area metadata and target pixel area metadata, and wherein the source pixel area metadata comprise information on a size, shape, and/or location of the source pixel area in the hidden image, and the target pixel area metadata comprise information on a size, shape, and/or location of the target pixel area in the current image.

3. The method according to claim 1, wherein the hidden image is generated at the video processing device.

4. The method according to claim 1 wherein the source pixel area in the hidden image and the target pixel area in the current image have common features, including one or more of size, shape, resolution, and/or location in the image.

5. The method according to claim 1, wherein the hidden image is an alternative reference frame.

6. The method according to claim 1, wherein the current image is divided into blocks such that none of the blocks located outside the target pixel area and adjacent to the target pixel area overlaps with a block located inside the target pixel area.

7. The method according to claim 1, wherein the current image is divided into blocks such that a size of blocks adjacent to a border of the target pixel area is a smallest size among respective sizes of blocks of the current image, and the border of the target pixel area is determined by blocks located inside the target pixel area that are adjacent to blocks located outside the target pixel area.

8. The method according to claim 1, wherein the target pixel area is an animated target pixel area corresponding to a plurality of source pixel areas in the hidden image, wherein the plurality of source pixel areas in the hidden image respectively corresponds to images of an animation played in the animated target pixel area.

9. The method according to claim 8, wherein one or several respective corresponding blocks of each of the plurality of the source pixel area are predicted from other respective corresponding blocks of the plurality of source pixel areas.

10. The method according to claim 1, wherein one or more blocks of the current image located outside of the target pixel area are predicted only based on one or more blocks located outside the target pixel area in the current image, or one or more blocks located outside an area that corresponds to the target pixel area in one or more reference images, or one or more blocks located outside the target pixel area in the current image and one or more blocks located outside an area that corresponds to the target pixel area in one or more reference images.

11. A method for processing an encoded video bitstream at a video processing unit comprising a processor, the method comprising:
receiving the encoded video bitstream, wherein the encoded video bitstream comprises data representing an encoding of a current image of a set of images using encoding parameters;
obtaining an image;
decoding the encoded video bitstream, the decoding comprising:
generating a decoded hidden image of the set of images,
based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image,
wherein the method further comprises:
obtaining, from metadata describing the encoded video sequence, metadata defining the target pixel area in the current image, wherein the obtained metadata indicates that the hidden image included in the encoded video sequence is usable to customize the current image.

12. An apparatus, the apparatus comprising a processor and a memory operatively coupled to the processor, wherein the apparatus is configured to perform a method for processing a current image of a set of images, the method comprising, at a video processing device comprising a processor:
determining a target pixel area in the current image;
obtaining a hidden image of the set of images, the hidden image comprising a source pixel area;
dividing the current image into blocks for encoding of the blocks of the current image according to an encoding sequence; and
for a block of the target pixel area of the current image:
determining a motion vector pointing to a block of the source pixel area in the hidden image corresponding to the block of the target pixel area, and
based on the motion vector, encoding the block of the target pixel area according to a temporal correlation prediction mode pursuant to which no pixel residual representing a difference between the block of the target pixel area and the corresponding block of the source pixel area is generated,
wherein the hidden image and the current image are images of the set of images of a video sequence to be encoded according to a video encoding scheme,
the method further comprising:
obtaining metadata defining the target pixel area in the current image, wherein the obtained metadata indicates that the hidden image included in the encoded video sequence is usable to customize the current image, and
including the metadata in metadata describing the encoded video sequence.

13. A non-transitory computer-readable medium encoded with executable instructions which, when executed, causes an apparatus comprising a processor operatively coupled with a memory, to perform a method for processing a current image of a set of images, the method comprising, at a video processing device comprising a processor:
determining a target pixel area in the current image;
obtaining a hidden image of the set of images, the hidden image comprising a source pixel area;
dividing the current image into blocks for encoding of the blocks of the current image according to an encoding sequence; and
for a block of the target pixel area of the current image:
determining a motion vector pointing to a block of the source pixel area in the hidden image corresponding to the block of the target pixel area, and
based on the motion vector, encoding the block of the target pixel area according to a temporal correlation prediction mode pursuant to which no pixel residual representing a difference between the block of the target pixel area and the corresponding block of the source pixel area is generated,
wherein the hidden image and the current image are images of the set of images of a video sequence to be encoded according to a video encoding scheme,
the method further comprising:
obtaining metadata defining the target pixel area in the current image, wherein the obtained metadata indicates that the hidden image included in the encoded video sequence is usable to customize the current image, and
including the metadata in metadata describing the encoded video sequence.

14. An apparatus, the apparatus comprising a processor and a memory operatively coupled to the processor, wherein the apparatus is configured to perform a method for processing an encoded video bitstream at a video processing unit comprising a processor, the method comprising:
receiving the encoded video bitstream, wherein the encoded video bitstream comprises data representing an encoding of a current image of a set of images using encoding parameters;
obtaining an image;
decoding the encoded video bitstream, the decoding comprising:
generating a decoded hidden image of the set of images,
based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image,
wherein the method further comprises:
obtaining, from metadata describing the encoded video sequence, metadata defining the target pixel area in the current image, wherein the obtained metadata indicates that the hidden image included in the encoded video sequence is usable to customize the current image.

15. A non-transitory computer-readable medium encoded with executable instructions which, when executed, causes an apparatus comprising a processor operatively coupled with a memory, to perform a method for processing an encoded video bitstream at a video processing unit comprising a processor, the method comprising:
receiving the encoded video bitstream, wherein the encoded video bitstream comprises data representing an encoding of a current image of a set of images using encoding parameters;
obtaining an image;
decoding the encoded video bitstream, the decoding comprising:
generating a decoded hidden image of the set of images,
based on parameters for decoding a block of a target pixel area of a current image of the set of images, the encoding parameters specifying use of a temporal correlation prediction mode pursuant to which no pixel residual representing a difference between the block of the target pixel area and a corresponding block of a source pixel area in the hidden image is generated, and comprising a motion vector pointing to a block of the source pixel area in the hidden image corresponding to the block of the target pixel area, decoding the block of the target pixel area of the current image using a block of the image instead of the block of the source pixel area in the decoded hidden image,
wherein the method further comprises:
obtaining, from metadata describing the encoded video sequence, metadata defining the target pixel area in the current image, wherein the obtained metadata indicates that the hidden image included in the encoded video sequence is usable to customize the current image.

16. The apparatus according to claim 14, wherein the metadata comprise source pixel area metadata and target pixel area metadata, and wherein the source pixel area metadata comprise information on a size, shape, and/or location of the source pixel area in the hidden image, and the target pixel area metadata comprise information on a size, shape, and/or location of the target pixel area in the current image.

17. The method according to claim 11, wherein the image is a user-specific hidden images to be used during the decoding of the received encoded video bitstream to replace the hidden image comprised in the received encoded video bitstream.

18. The apparatus according to claim 14, wherein the image is a user-specific hidden images to be used during the decoding of the received encoded video bitstream to replace the hidden image comprised in the received encoded video bitstream.

19. The non-transitory computer-readable medium according to claim 15, wherein the image is a user-specific hidden images to be used during the decoding of the received encoded video bitstream to replace the hidden image comprised in the received encoded video bitstream.

* * * * *